US012707392B2

(12) United States Patent
Bar-Or Tillinger et al.

(10) Patent No.: US 12,707,392 B2
(45) Date of Patent: Aug. 11, 2026

(54) LOW POWER WAKE-UP SIGNALING CAPABILITIES

(71) Applicant: QUALCOMM Incorporated, San Diego, CA (US)

(72) Inventors: Amit Bar-Or Tillinger, Tel-Aviv (IL); Gideon Shlomo Kutz, Ramat Hasharon (IL); Tal Oved, Modiin (IL); Oren Matsrafi, Yad Modechai (IL)

(73) Assignee: QUALCOMM Incorporated, San Diego, CA (US)

( * ) Notice: Subject to any disclaimer, the term of this patent is extended or adjusted under 35 U.S.C. 154(b) by 537 days.

(21) Appl. No.: 18/077,102

(22) Filed: Dec. 7, 2022

(65) Prior Publication Data

US 2024/0196329 A1 Jun. 13, 2024

(51) Int. Cl.
*H04W 52/02* (2009.01)
*H04W 72/0453* (2023.01)

(52) U.S. Cl.
CPC ... *H04W 52/0235* (2013.01); *H04W 72/0453* (2013.01)

(58) Field of Classification Search
None
See application file for complete search history.

(56) References Cited

U.S. PATENT DOCUMENTS

2020/0137770 A1* 4/2020 Chitrakar .......... H04W 72/0446
2022/0141770 A1 5/2022 Ahn et al.
2024/0397422 A1* 11/2024 Martin .............. H04W 52/0235
2024/0422676 A1* 12/2024 Xu ........................ H04L 5/0023

FOREIGN PATENT DOCUMENTS

WO WO-2022205042 A1 10/2022

OTHER PUBLICATIONS

Partial International Search Report—PCT/US2023/077762—ISA/EPO—Feb. 22, 2024 (2206841WO).
Qualcomm Incorporated: "L1 Signal Design and Procedures for LP-WUR", R1-2212144, Type Discussion, FS_NR_LPWUS, 3rd Generation Partnership Project (3GPP), Mobile Competence Centre, 650, Route Des Lucioles, F-06921 Sophia-antipolis Cedex, France, vol. 3GPP RAN 1, No. Toulouse, FR, Nov. 14, 2022-Nov. 18, 2022, Nov. 7, 2022, XP052222707, 13 Pages.
International Search Report and Written Opinion—PCT/US2023/077762—ISA/EPO—Apr. 12, 2024 (2206841WO).

* cited by examiner

*Primary Examiner* — The Hy Nguyen
(74) *Attorney, Agent, or Firm* — Holland & Hart LLP

(57) ABSTRACT

A user equipment (UE) may transmit, to a network entity, a capability message that indicates a set of one or more wake-up signal parameters associated with one or more wake-up signal waveform types supported by the UE. The network entity may transmit an indication of a set of wake-up signals to be monitored by the UE based on the capability message. The UE may monitor for the wake-up signals accordingly. In some examples, the network entity may determine a group of UEs based on wake-up signal parameters being common to the UEs in the group. Each of the UEs may monitor, using a first transceiver associated with a first mode of operation, for a group wake-up signal including a request for each UE of the group of UEs to activate a second transceiver associated with a second mode of operation and higher power consumption than the first transceiver.

26 Claims, 21 Drawing Sheets

LOW POWER WAKE-UP SIGNALING CAPABILITIES

FIELD OF TECHNOLOGY

The following relates to wireless communications, including low power wake-up signaling capabilities.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

The UE may operate in and transition between various different power modes to reduce power consumption. The UE may receive signaling, such as a wake-up signal (WUS), from a network entity that triggers the UE to transition from a low power mode to a higher power mode.

SUMMARY

The described techniques relate to improved methods, systems, devices, and apparatuses that support low power wake-up signaling capabilities. For example, the described techniques provide for a user equipment (UE) to transmit, to a network entity, a capability message that indicates one or more waveform types supported by the UE. The capability message may include one or more parameters associated with each waveform type, such as a sequence length of the waveform type, a quantity of different sequences the UE is capable of monitoring simultaneously, a quantity of frequency domain allocation positions the UE is capable of monitoring at the same time, a quantity of time domain hypothesis the UE is capable of using per sequence, or any combination thereof. The network entity may receive the capability message, select a waveform type based on the capability, and transmit a wake-up signal (WUS) using a waveform of the selected waveform type.

In some examples, the network entity may assign multiple UEs to a wake-up group. The grouping of UEs may be based on the UEs sharing similarities in capabilities or WUS parameters, such as similar downlink beams or link conditions. A single UE may be assigned to one or more groups. The network entity may transmit a single WUS to each of the UEs in a wake-up group based on the similar characteristics between the UEs. By transmitting a WUS to a group of UEs, the network entity may reduce resource consumption. The UEs may monitor for the WUS while operating in a reduced power mode and may transition to a relatively higher power mode in response to reception of a WUS.

A method for wireless communications at a UE is described. The method may include transmitting a capability message that indicates a respective set of one or more WUS parameters associated with one or more WUS waveform types that are supported by the UE, receiving an indication of a set of WUSs to be monitored by the UE, the set of WUSs based on the respective set of one or more WUS parameters and the one or more WUS waveform types that are supported by the UE, and monitoring, while operating in a low power mode, for at least one WUS of the set of WUSs based on the indication.

An apparatus for wireless communications at a UE is described. The apparatus may include a processor, memory coupled with the processor, and instructions stored in the memory. The instructions may be executable by the processor to cause the apparatus to transmit a capability message that indicates a respective set of one or more WUS parameters associated with one or more WUS waveform types that are supported by the UE, receive an indication of a set of WUSs to be monitored by the UE, the set of WUSs based on the respective set of one or more WUS parameters and the one or more WUS waveform types that are supported by the UE, and monitor, while operating in a low power mode, for at least one WUS of the set of WUSs based on the indication.

Another apparatus for wireless communications at a UE is described. The apparatus may include means for transmitting a capability message that indicates a respective set of one or more WUS parameters associated with one or more WUS waveform types that are supported by the UE, means for receiving an indication of a set of WUSs to be monitored by the UE, the set of WUSs based on the respective set of one or more WUS parameters and the one or more WUS waveform types that are supported by the UE, and means for monitoring, while operating in a low power mode, for at least one WUS of the set of WUSs based on the indication.

A non-transitory computer-readable medium storing code for wireless communications at a UE is described. The code may include instructions executable by a processor to transmit a capability message that indicates a respective set of one or more WUS parameters associated with one or more WUS waveform types that are supported by the UE, receive an indication of a set of WUSs to be monitored by the UE, the set of WUSs based on the respective set of one or more WUS parameters and the one or more WUS waveform types that are supported by the UE, and monitor, while operating in a low power mode, for at least one WUS of the set of WUSs based on the indication.

Some examples of the method, apparatuses, and non-transitory computer-readable medium described herein may further include operations, features, means, or instructions for receiving an indication of a respective set of sequence parameters associated with each WUS of the set of WUSs, a respective frequency position associated with each WUS of the set of WUSs, a time slot associated with each WUS, or any combination thereof, where monitoring for the at least one WUS of the set of WUSs may be based on the respective sets of sequence parameters, or the respective frequency positions, or both.

In some examples of the method, apparatuses, and non-transitory computer-readable medium described herein, transmitting the capability message may include operations, features, means, or instructions for transmitting an indication of a respective sequence length supported by the UE for each WUS waveform type of the one or more WUS waveform types that may be supported by the UE, where the respective sequence lengths each include a respective quantity of time-domain symbols included in a respective WUS waveform type.

In some examples of the method, apparatuses, and non-transitory computer-readable medium described herein, transmitting the capability message may include operations, features, means, or instructions for transmitting an indication of a quantity of waveform sequences that the UE may be capable of concurrently receiving within overlapping frequency resources, where each waveform sequence of the quantity corresponds to a respective sequence of one or more bit values.

In some examples of the method, apparatuses, and non-transitory computer-readable medium described herein, transmitting the capability message may include operations, features, means, or instructions for transmitting an indication of a quantity of frequency domain allocation positions that the UE may be capable of concurrently monitoring for a WUS waveform.

In some examples of the method, apparatuses, and non-transitory computer-readable medium described herein, transmitting the capability message may include operations, features, means, or instructions for transmitting an indication of a respective quantity of time domain hypotheses supported by the UE for each WUS waveform type of the one or more WUS waveform types that may be supported by the UE, where the respective quantities of time domain hypotheses each correspond to a respective quantity of time positions that the UE may be capable of monitoring for a WUS waveform of a corresponding WUS waveform type.

In some examples of the method, apparatuses, and non-transitory computer-readable medium described herein, the UE may be included in one or more groups of UEs, each group of the one or more groups including the UE and at least one other UE based on the at least one other UE also supporting at least some of the respective sets of one or more WUS parameters and the one or more WUS waveform types that may be supported by the UE and the set of WUSs includes a respective group WUS for each of the one or more groups of UEs.

Some examples of the method, apparatuses, and non-transitory computer-readable medium described herein may further include operations, features, means, or instructions for receiving a WUS from the set of WUSs based on the monitoring and transitioning from the low power mode to a second power mode in response to receiving the WUS.

In some examples of the method, apparatuses, and non-transitory computer-readable medium described herein, the one or more WUS waveform types include one or more orthogonal frequency division multiplexing (OFDM) waveform types, one or more on-off keying (OOK) waveform types, or any combination thereof.

A method for wireless communications at a UE is described. The method may include monitoring, using a first transceiver of the UE associated with a first mode of operation for the UE, for a group WUS, receiving the group WUS based on the monitoring, the group WUS including a request for each UE of a group of UEs to transition from the first mode of operation to a second mode of operation, where the group of UEs includes the UE and at least one other UE, and where the UEs in the group are included in the group based on a set of WUS waveform parameters being common to the UEs in the group, and activating, in response to receiving the group WUS, a second transceiver of the UE associated with the second mode of operation for the UE, where the second transceiver is associated with higher power consumption than the first transceiver.

An apparatus for wireless communications at a UE is described. The apparatus may include a processor, memory coupled with the processor, and instructions stored in the memory. The instructions may be executable by the processor to cause the apparatus to monitor, using a first transceiver of the UE associated with a first mode of operation for the UE, for a group WUS, receive the group WUS based on the monitoring, the group WUS including a request for each UE of a group of UEs to transition from the first mode of operation to a second mode of operation, where the group of UEs includes the UE and at least one other UE, and where the UEs in the group are included in the group based on a set of WUS waveform parameters being common to the UEs in the group, and activate, in response to receiving the group WUS, a second transceiver of the UE associated with the second mode of operation for the UE, where the second transceiver is associated with higher power consumption than the first transceiver.

Another apparatus for wireless communications at a UE is described. The apparatus may include means for monitoring, using a first transceiver of the UE associated with a first mode of operation for the UE, for a group WUS, means for receiving the group WUS based on the monitoring, the group WUS including a request for each UE of a group of UEs to transition from the first mode of operation to a second mode of operation, where the group of UEs includes the UE and at least one other UE, and where the UEs in the group are included in the group based on a set of WUS waveform parameters being common to the UEs in the group, and means for activating, in response to receiving the group WUS, a second transceiver of the UE associated with the second mode of operation for the UE, where the second transceiver is associated with higher power consumption than the first transceiver.

A non-transitory computer-readable medium storing code for wireless communications at a UE is described. The code may include instructions executable by a processor to monitor, using a first transceiver of the UE associated with a first mode of operation for the UE, for a group WUS, receive the group WUS based on the monitoring, the group WUS including a request for each UE of a group of UEs to transition from the first mode of operation to a second mode of operation, where the group of UEs includes the UE and at least one other UE, and where the UEs in the group are included in the group based on a set of WUS waveform parameters being common to the UEs in the group, and activate, in response to receiving the group WUS, a second transceiver of the UE associated with the second mode of operation for the UE, where the second transceiver is associated with higher power consumption than the first transceiver.

Some examples of the method, apparatuses, and non-transitory computer-readable medium described herein may further include operations, features, means, or instructions for transmitting a capability message that indicates one or more WUS waveform types and one or more sets of WUS waveform parameters that may be supported by the UE, the one or more sets of WUS waveform parameters including the set of WUS waveform parameters that may be common to the UEs in the group.

In some examples of the method, apparatuses, and non-transitory computer-readable medium described herein, the UEs in the group may be included in the group based on downlink beams used for communications by the UEs, link conditions associated with communications at the UEs, applications executed by the UEs, or any combination thereof.

In some examples of the method, apparatuses, and non-transitory computer-readable medium described herein, the UE may be included in the group of UEs and one or more second groups of UEs based on one or more sets of WUS waveform parameters that may be supported by the UE.

A method for wireless communications at a network entity is described. The method may include receiving a capability message that indicates a respective set of one or more WUS parameters associated with one or more WUS waveform types that are supported by a UE in communication with the network entity, transmitting an indication of a set of WUSs to be monitored by the UE while operating in a low power mode, the set of WUSs based on the respective set of one or more WUS parameters and the one or more WUS waveform types that are supported by the UE, and transmitting at least one WUS of the set of WUSs based on the indication.

An apparatus for wireless communications at a network entity is described. The apparatus may include a processor, memory coupled with the processor, and instructions stored in the memory. The instructions may be executable by the processor to cause the apparatus to receive a capability message that indicates a respective set of one or more WUS parameters associated with one or more WUS waveform types that are supported by a UE in communication with the network entity, transmit an indication of a set of WUSs to be monitored by the UE while operating in a low power mode, the set of WUSs based on the respective set of one or more WUS parameters and the one or more WUS waveform types that are supported by the UE, and transmit at least one WUS of the set of WUSs based on the indication.

Another apparatus for wireless communications at a network entity is described. The apparatus may include means for receiving a capability message that indicates a respective set of one or more WUS parameters associated with one or more WUS waveform types that are supported by a UE in communication with the network entity, means for transmitting an indication of a set of WUSs to be monitored by the UE while operating in a low power mode, the set of WUSs based on the respective set of one or more WUS parameters and the one or more WUS waveform types that are supported by the UE, and means for transmitting at least one WUS of the set of WUSs based on the indication.

A non-transitory computer-readable medium storing code for wireless communications at a network entity is described. The code may include instructions executable by a processor to receive a capability message that indicates a respective set of one or more WUS parameters associated with one or more WUS waveform types that are supported by a UE in communication with the network entity, transmit an indication of a set of WUSs to be monitored by the UE while operating in a low power mode, the set of WUSs based on the respective set of one or more WUS parameters and the one or more WUS waveform types that are supported by the UE, and transmit at least one WUS of the set of WUSs based on the indication.

Some examples of the method, apparatuses, and non-transitory computer-readable medium described herein may further include operations, features, means, or instructions for receiving an indication of a respective set of sequence parameters associated with each WUS of the set of WUSs, a respective frequency position associated with each WUS of the set of WUSs, a time slot associated with each WUS, or any combination thereof, where transmitting the at least one WUS may be based on the respective sets of sequence parameters, or the respective frequency positions, or both.

In some examples of the method, apparatuses, and non-transitory computer-readable medium described herein, receiving the capability message may include operations, features, means, or instructions for receiving an indication of a respective sequence length supported by the UE for each WUS waveform type of the one or more WUS waveform types that may be supported by the UE, where the respective sequence lengths each include a respective quantity of time-domain symbols included in a respective WUS waveform type.

In some examples of the method, apparatuses, and non-transitory computer-readable medium described herein, receiving the capability message may include operations, features, means, or instructions for receiving an indication of a quantity of waveform sequences that the UE may be capable of concurrently receiving within overlapping frequency resources, where each waveform sequence of the quantity corresponds to a respective sequence of one or more bits.

In some examples of the method, apparatuses, and non-transitory computer-readable medium described herein, receiving the capability message may include operations, features, means, or instructions for receiving an indication of a quantity of frequency domain allocation positions that the UE may be capable of concurrently monitoring for a WUS waveform.

In some examples of the method, apparatuses, and non-transitory computer-readable medium described herein, receiving the capability message may include operations, features, means, or instructions for receiving an indication of a respective quantity of time domain hypotheses supported by the UE for each WUS waveform type of the one or more WUS waveform types that may be supported by the UE, where the respective quantities of time domain hypotheses each correspond to a respective quantity of time positions that the UE may be capable of monitoring for a WUS waveform of a corresponding WUS waveform type.

Some examples of the method, apparatuses, and non-transitory computer-readable medium described herein may further include operations, features, means, or instructions for receiving a second capability message from a second UE that indicates a second respective set of one or more WUS parameters associated with one or more second WUS waveform types that may be supported by the second UE and determining a group of UEs including the UE and the second UE based on the respective set of one or more WUS parameters and the one or more WUS waveform types that may be supported by the UE at least partially overlapping with the second respective set of one or more WUS parameters and the one or more second WUS waveform types that may be supported by the second UE, where the set of WUSs includes a respective group WUS for the group of UEs.

Some examples of the method, apparatuses, and non-transitory computer-readable medium described herein may further include operations, features, means, or instructions for determining the set of WUSs based on the respective set of one or more WUS parameters and the one or more WUS waveform types that may be supported by the UE.

In some examples of the method, apparatuses, and non-transitory computer-readable medium described herein, the one or more WUS waveform types include one or more OFDM waveform types, one or more OOK waveform types, or any combination thereof.

A method for wireless communications at a network entity is described. The method may include determining a group of UEs, where the UEs are included in the group based on a set of WUS waveform parameters being common to the UEs, transmitting a group WUS based on determining the group of UEs, the group WUS including a request for each UE of the group of UEs to transition from a first mode of operation to a second mode of operation, and transmitting a communication to at least one UE of the group of UEs to activate a second transceiver of the UE, where a second transceiver power of the second transceiver is associated with higher power consumption than a first transceiver of the UE that is associated with the first mode of operation.

An apparatus for wireless communications at a network entity is described. The apparatus may include a processor, memory coupled with the processor, and instructions stored in the memory. The instructions may be executable by the processor to cause the apparatus to determine a group of UEs, where the UEs are included in the group based on a set of WUS waveform parameters being common to the UEs, transmit a group WUS based on determining the group of UEs, the group WUS including a request for each UE of the group of UEs to transition from a first mode of operation to a second mode of operation, and transmit a communication to at least one UE of the group of UEs to activate a second transceiver of the UE, where a second transceiver power of the second transceiver is associated with higher power consumption than a first transceiver of the UE that is associated with the first mode of operation.

Another apparatus for wireless communications at a network entity is described. The apparatus may include means for determining a group of UEs, where the UEs are included in the group based on a set of WUS waveform parameters being common to the UEs, means for transmitting a group WUS based on determining the group of UEs, the group WUS including a request for each UE of the group of UEs to transition from a first mode of operation to a second mode of operation, and means for transmitting a communication to at least one UE of the group of UEs to activate a second transceiver of the UE, where a second transceiver power of the second transceiver is associated with higher power consumption than a first transceiver of the UE that is associated with the first mode of operation.

A non-transitory computer-readable medium storing code for wireless communications at a network entity is described. The code may include instructions executable by a processor to determine a group of UEs, where the UEs are included in the group based on a set of WUS waveform parameters being common to the UEs, transmit a group WUS based on determining the group of UEs, the group WUS including a request for each UE of the group of UEs to transition from a first mode of operation to a second mode of operation, and transmit a communication to at least one UE of the group of UEs to activate a second transceiver of the UE, where a second transceiver power of the second transceiver is associated with higher power consumption than a first transceiver of the UE that is associated with the first mode of operation.

Some examples of the method, apparatuses, and non-transitory computer-readable medium described herein may further include operations, features, means, or instructions for receiving, from the UE of the group of UEs, a first capability message that indicates one or more first WUS waveform types and one or more first sets of WUS waveform parameters that may be supported by the UE and receiving, from a second UE of the group of UEs, a second capability message that indicates one or more second WUS waveform types and one or more second sets of WUS waveform parameters that may be supported by the second UE, where determining the group of UEs may be based on the one or more first sets of WUS waveform parameters and the one or more second sets of WUS waveform parameters including the set of WUS waveform parameters that may be common to the UEs in the group.

In some examples of the method, apparatuses, and non-transitory computer-readable medium described herein, determining the group of UEs may include operations, features, means, or instructions for determining to include the UEs in the group based on downlink beams used for communications by the UEs.

In some examples of the method, apparatuses, and non-transitory computer-readable medium described herein, determining the group of UEs may include operations, features, means, or instructions for determining to include the UEs in the group based on link conditions associated with communications at the UEs.

In some examples of the method, apparatuses, and non-transitory computer-readable medium described herein, determining the group of the UEs may include operations, features, means, or instructions for determining to include the UEs in the group based on applications executed by the UEs.

DETAILED DESCRIPTION

Figure 1:
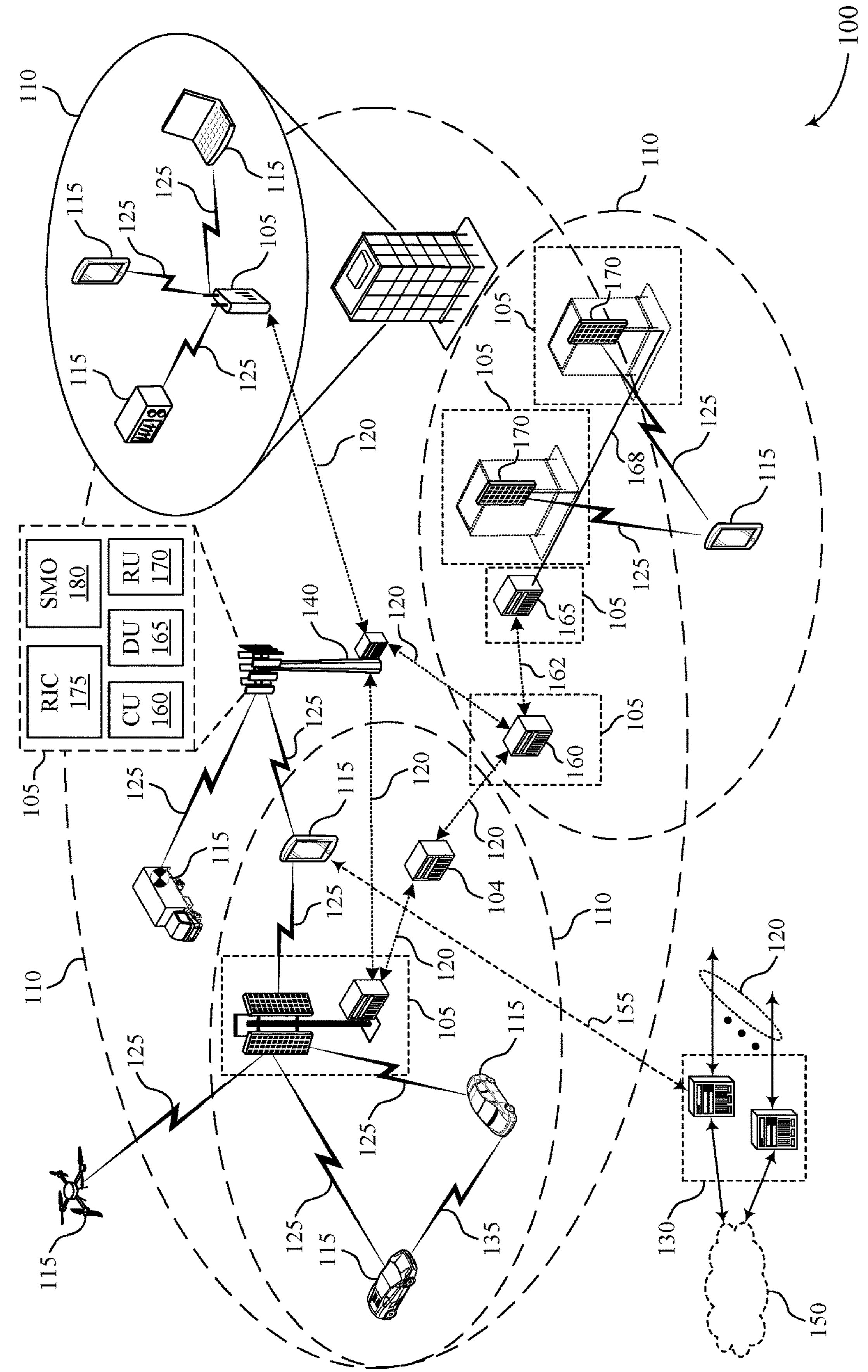
FIG. 1 illustrates an example of a wireless communications system that supports low power wake-up signaling capabilities in accordance with one or more aspects of the present disclosure.

In some wireless communications systems, a user equipment (UE) may transition between a reduced power mode (also referred to as a sleep mode) and a relatively higher power mode (also referred to as a wake mode) in response to receipt of a wake-up signal (WUS) (e.g., a low-power WUS (LP-WUS)) to reduce power consumption. A network entity may transmit the WUS to the UE when the network entity has data to communicate with the UE. The UE may monitor for the WUS using a first transceiver (e.g., a low power transceiver), and the UE may activate a second transceiver associated with relatively higher power consumption than the first transceiver in response to the WUS, to use for communicating with the network entity. The network entity may use different types of waveforms to transmit the WUS. The different waveform types may be associated with different parameters and characteristics, some of which may be more optimal for different UE conditions (e.g., different signal-to-noise ratio (SNR) and mobility conditions). In some examples, the network entity may not know which types of waveforms are supported by the UE.

The description herein supports techniques for a UE to transmit, to a network entity, a capability message that indicates one or more waveform types supported by the UE. The capability message may include one or more parameters associated with each waveform type, such as a sequence length of the waveform type, a quantity of different sequences the UE is capable of monitoring at the same time, a quantity (e.g., quantity) of frequency domain allocation positions the UE is capable of monitoring at the same time, a quantity of time domain hypothesis the UE is capable of using per sequence, or any combination thereof. The network entity may receive the capability message, select a waveform type based on the capability, and transmit a WUS to the UE using a waveform of the selected waveform type. The network entity described herein may thereby account for capabilities of the UE when transmitting a WUS.

In some examples, the network entity may assign multiple UEs to a wake-up group. The grouping of UEs may be based on the UEs sharing similarities in capabilities or WUS parameters, such as similar downlink beams or link conditions. A single UE may be assigned to one or more groups. The network entity may transmit a single WUS, referred to as a group WUS, to each of the UEs in a wake-up group based on the similar characteristics between the UEs. The group WUS may be transmitted via a broadcast message to all the UEs in the group, or via unicast messages to each UE in the group. By transmitting a same group WUS to a group of UEs, the network entity may reduce resource consumption and overhead as compared to transmitting a different WUS to each UE. The UEs may monitor for the group WUS while operating in a reduced power mode and may transition to a relatively higher power mode in response to reception of the WUS. The network entity may select the group WUS, may define the wake-up group of UEs, or both based on one or more capability messages received from the UEs. The network entity may thereby support capability signaling and UE grouping for wake-up signaling, which may improve coordination between devices, reduce power consumption, and improve throughput, among other advantages.

Aspects of the disclosure are initially described in the context of wireless communications systems. Aspects of the disclosure are further illustrated by and described with reference to process flow diagrams, apparatus diagrams, system diagrams, and flowcharts that relate to low power wake-up signaling capabilities.

FIG. 1 illustrates an example of a wireless communications system 100 that supports low power wake-up signaling capabilities in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support low power wake-up signaling capabilities as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115).

In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The description herein supports techniques for a UE 115 to transmit, to a network entity 105, a capability message that indicates one or more waveform types supported by the UE 115. The capability message may include one or more parameters associated with each waveform type, such as a sequence length of the waveform type, a quantity of different sequences the UE 115 is capable of monitoring simultaneously, a quantity of frequency domain allocation positions the UE 115 is capable of monitoring at the same time, a quantity of time domain hypothesis the UE 115 is capable of using per sequence, or any combination thereof. The network entity 105 may receive the capability message, select a waveform type based on the capability, and transmit a WUS using a waveform of the selected waveform type.

In some examples, the network entity 105 may assign multiple UEs 115 to a wake-up group. The grouping of UEs 115 may be based on the UEs 115 sharing similarities in capabilities or WUS parameters, such as similar downlink beams or link conditions. A single UE may be assigned to one or more groups. The network entity may transmit a single WUS to each of the UEs 115 in a wake-up group based on the similar characteristics between the UEs 115. By transmitting a WUS to a group of UEs 115, the network entity 105 may reduce resource consumption. The UEs 115 may monitor for the WUS while operating in a reduced power mode and may transition to a relatively higher power mode in response to reception of a WUS.

Figure 2:
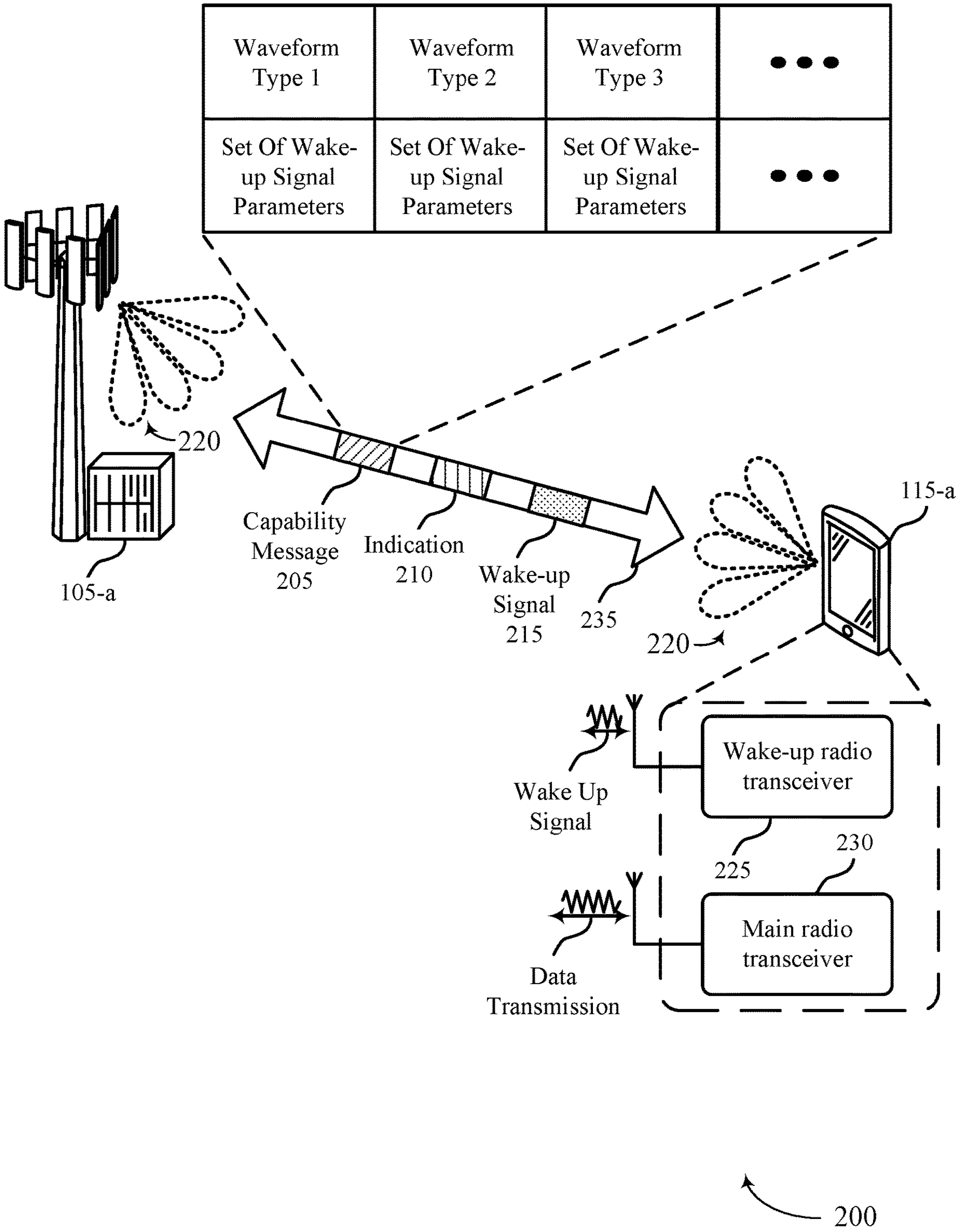
FIG. 2 illustrates an example of a wireless communications system that supports low power wake-up signaling capabilities in accordance with one or more aspects of the present disclosure.

FIG. 2 illustrates an example of a wireless communications system 200 that supports low power wake-up signaling capabilities in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-*a* and a network entity 105-*a*, which may be examples of corresponding devices described herein. The network entity 105-*a* may communicate with the UE 115-*a* via a communication link 235. The network entity 105-*a* and the UE 115-*a* may communicate using one or more beams 220, which may be transmit beams 220, receive beams 220, or both. In this example, the UE 115-*a* may transmit a capability message 205 that indicates wake-up signaling capabilities of the UE 115-*a*, and the network entity 105-*a* may select a WUS 215 for transmission to the UE 115-*a* based on the capability message 205.

In some examples, the UE 115-*a* may operate in a discontinuous reception (DRX) mode, where the UE 115-*a* may periodically cycle between DRX on and DRX off durations of a DRX cycle. During the DRX on durations, the UE 115-*a* may use a main radio transceiver 230 of the UE 115-*a* to monitor for the WUS 215 or other signaling indicating a scheduled transmission from the network entity 105-*a*. The network entity 105-*a* may transmit the WUS 215 to the UE 115-*a* when the network entity 105-*a* has data to communicate with the UE 115-*a*. In some cases, the UE 115-*a* may utilize a wake-up radio transceiver 225 (which may be referred to as a low-power wake-up radio (LP-WUR) in some aspects herein), such that the UE 115-*a* may continuously monitor for the WUS 215 (e.g., even if the UE 115-*a* is in a DRX off duration or if the UE 115-*a* does not support DRX). The wake-up radio transceiver 225 may be associated with reduced power consumption as compared with the main radio transceiver 230 or other transceivers of the UE 115-*a*. In some examples, the wake-up radio transceiver 225 may be an analog transceiver and the main radio transceiver 230 may be a digital or analog transceiver. The reduced power consumption of the wake-up radio transceiver 225 may be based on or associated with the wake-up radio transceiver 225 supporting analog communications. Thus, utilizing the wake-up radio transceiver 225 to monitor for the WUS 215 while the main radio transceiver 230 is deactivated may provide reduced power consumption as compared to using the main radio transceiver 230 continuously or during DRX on durations. Thus, the LP-WUR, or the wake-up radio transceiver 225, may receive a low power WUS 215 for the UE 115-*a* in sleep mode.

In response to detecting the WUS, the wake-up radio transceiver 225 may indicate, to a main microcontroller unit (MCU) interrupt of the UE 115-*a*, that the WUS 215 was received (e.g., via an electrical signal or flag between the wake-up radio transceiver 225 and the MCU). The MCU interrupt, or the wake-up radio transceiver 225, or both may indicate the WUS 215 to the main radio transceiver 230. The LP-WUR, or the wake-up radio transceiver 225, thus receives the WUS 215 using low power. The main radio transceiver 230 may be activated or "wake-up" to begin transmission and reception of data with the network entity 105-*a* based on the WUS 215. That is, the UE 115-*a* may transition from a lower power state or mode of operation (e.g., a sleep mode) using the wake-up radio transceiver 225 to a relatively higher power state or mode of operation (e.g., a wake mode) using the main radio transceiver 230 in response to the WUS 215. The network entity 105-*a* and the UE 115-*a* may thereby support reduced power consumption while maintaining throughput and communication reliability by utilizing a WUS 215.

The network entity 105-*a* and the UE 115-*a* may support such low power wake-up signaling techniques by selecting different waveform types for modulating and transmitting the WUS 215, selecting different types of channel coding used for transmitting and receiving the WUS 215, adjusting time and frequency error tolerance levels, or any combination thereof. For example, the network entity 105-*a* may modulate and transmit the WUS 215 via one or more different types of waveforms to achieve a low power wake-up signaling design that may support reduced complexity receivers, reduced channel coding complexity, and adjusted error tolerance while maintaining cell coverage and efficient usage of system resources. In some examples, reception of the WUS 215 via the wake-up radio transceiver 225 (e.g., the LP-WUR) may reduce degradation of cell coverage, reduce impacts on allowed maximum path loss, and reduce system throughput degraded via efficient usage of system resources. In some examples, maintaining cell coverage may use a relatively large quantity of system resources (e.g., transmit power, quantity of frequency resources, quantity of time resources, etc.), may increase the complexity and power consumption at a receiver, which may reduce the effects of low power transmission, or both.

To achieve such a low power wake-up signaling design, the network entity 105-*a* may select a type of waveform from among multiple waveform types such as on/off keying (OOK) modulation or OFDM waveform types. The network entity 105-*a* may select one or more waveform types from a set of multiple WUS waveform types based on conditions at the UE 115-*a* (e.g., an SNR, a mobility of the UE 115-*a*, other conditions, or any combination thereof). For example, the network entity 105-*a* may use OOK modulation to modulate the WUS 215 for transmission to the UE 115-*a*. OOK modulation may be relatively efficient and may reduce transmission and reception complexity of the signaling as compared with other types of waveforms, such as by using less complex resources at the UE 115-*a*. OOK signaling may be associated with a relatively simple waveform type that may be supported by analog receivers, such as the wake-up radio transceiver 225, for example. Additionally, or alternatively, an OOK signal may have a relatively high tolerance for frequency or time errors, thus reducing a quantity of times the UE 115-*a* may wake up for time or frequency synchronization loops maintenance.

If the network entity 105-*a* supports communications with multiple UEs 115 (not illustrated in FIG. 2), the network entity 105-*a* may select a waveform type per UE 115. The network entity 105-*a* may select the waveform type in a hierarchical manner, such that when the conditions at the UE 115-*a* are more optimal, a relatively low complexity and low power waveform type may be selected, and when conditions at the UE 115-*a* are less optimal, a more complex waveform type may be selected. In sub-optimal conditions at the UE 115-*a*, the network entity 105-*a* may select a downlink control information (DCI)-based WUS 215 to improve throughput and reliability. However, the UE 115-*a* may not support all waveform types, and the network entity 105-*a* may not know which waveform types the UE 115-*a* supports.

Techniques, systems, and devices described herein provide for the UE 115-*a* to transmit capability signaling that indicates WUS capabilities of the UE 115-*a*. The network entity 105-*a* may use the reported capabilities of the UE 115-*a* to select the WUS 215, to determine a wake-up group of UEs 115, or both The UE 115-*a* may transmit the capability message 205 to the network entity 105-*a* via the communication link 235. The capability message 205 may indicate the one or more capabilities corresponding to WUS parameters and WUS waveform types supported by the UE 115-*a*. The capability message 205 may be transmitted via a medium access control-control element (MAC-CE), uplink control information (UCI), or some other type of uplink signaling. In some examples, the UE 115-*a* may transmit the capability message 205 in response to establishing a connection with the network entity 105-*a* (e.g., before the UE 115-*a* enters a sleep or low power mode of operation). Additionally, or alternatively, the UE 115-*a* may transmit the capability message 205 to the network entity 105-*a* during communications with the network entity 105-*a*, such as periodically or dynamically based on a change in capabilities of the UE 115-*a*. In some examples, although not pictured in FIG. 2, the UE 115-*a* may establish a connection with one or more other network entities 105. In such cases, the UE 115-*a* may transmit a respective capability message 205 to each network entity 105.

The UE 115-*a* may indicate, via the capability message 205, one or more types of waveforms supported by the UE 115-*a* and a respective set of one or more WUS parameters associated with each of the one or more WUS 215 waveform types supported by the UE 115-*a*. For example, the waveform types may include OOK waveforms, OFDM waveforms, other types of waveforms, or any combination thereof. Each waveform type supported by the UE may be defined by a respective set of one or more WUS parameters, such as a sequence length in the time domain, a quantity of difference sequences the UE 115-*a* can monitor simultaneously, a quantity of frequency domain allocation positions the UE 115-*a* can monitor simultaneously, a quantity of time domain hypotheses per sequence, any other relevant parameters, or any combination thereof. Thus, the UE 115-*a* may indicate a respective set of WUS waveform parameters for each supported waveform type. As illustrated in FIG. 2, the UE 115-*a* may indicate a first set of WUS waveform parameters for a first waveform type (e.g., Waveform Type 1) supported by the UE 115-*a*, a second set of WUS waveform parameters for a second waveform type (e.g., Waveform Type 2) supported by the UE 115-*a*, and so on for one or more other waveform types.

The UE 115-*a* may indicate, via the capability message 205, a sequence length in the time domain that the UE 115-*a* supports for a given waveform type, which may represent a duration of a sequence of the waveform type, such as an OOK or OFDM waveform type. For example, the sequence length may indicate a quantity of time domain symbols (e.g., OOK symbols or OFDM symbols) that are supported by the UE 115-*a* within a single waveform for a given type of waveform. The UE 115-*a* may additionally, or alternatively, indicate, via the capability message 205, a quantity of different sequences the UE 115-*a* is capable of monitoring concurrently or simultaneously for a given waveform type. The quantity of sequences may correspond to a quantity of waveform sequences received via the same (e.g., overlapping) time resources and the same or different frequency resources. The sequences may each be defined by respective sequences of values (e.g., of bit values or other values), wherein a sequence included in the quantity of sequences may include the same values or different values than one or more other sequences included in the quantity of sequences. In some examples, such as for waveforms of the OOK waveform type, the values in a sequence may be a combination of ones and zeroes. In some other examples, such as for waveforms of the binary phase-shift keying (BPSK) waveform type, the values in a sequence may be a combination of positive ones and negative ones. Additionally, or alternatively, the values in a sequence may be any combination of complex values. Accordingly, the sequences may be different based on a type of coding applied to the sequences. Thus, the UE 115-*a* may indicate a quantity of sequences the UE 115-*a* is capable of receiving and decoding using the same resources. The network entity 105-*a* may consider the sequence length and quantity of sequences supported by the UE 115-*a*, as indicated via the capability message 205, when generating and transmitting the WUS 215.

In some examples, the UE 115-*a* may indicate, via the capability message 205, a WUS waveform parameter indicative of a quantity of frequency domain allocation positions the UE 115-*a* is capable of monitoring simultaneously for a given waveform type. Each frequency domain allocation position may represent a respective set of one or more frequency resources or subbands via which the UE 115-*a* is capable of monitoring in a given time period. The network entity 105-*a* may generate and transmit a WUS 215 to the UE 115-*a* starting in the indicated quantity of frequency domain allocation positions based on the capability message 205, such that the UE 115-*a* may be capable of monitoring for and receiving the WUS 215.

To reliably receive and decode waveform sequences while maintaining synchronized timing, the UE 115-*a* may utilize a starting and ending position of the waveform sequence, or a starting position and a duration of the waveform sequence. In some examples, a time tracking loop (TTL) at the UE 115-*a* may be inaccurate, such that the UE 115-*a* may not know the starting position of the waveform. In such cases, the UE 115-*a* may monitor multiple timing hypotheses (e.g., estimations of the starting position) for each monitoring sequence or waveform, which may improve time tracking reliability (e.g., may compensate for or improve relatively low quality of a TTL or an absence thereof during a time period, such as a sleep duration of the UE 115-*a*). The UE 115-*a* may attempt to receive a waveform in each of the timing hypothesis. If the UE 115-*a* detects relatively high energy in at least one of the timing hypothesis, the UE 115-*a* may determine that a WUS 215 waveform was transmitted via that starting position, and the UE 115-*a* may enter a wake mode accordingly. As described herein, the UE 115-*a* may indicate, to the network entity 105-*a* via the capability message 205, a quantity of timing hypotheses that the UE 115-*a* is capable of monitoring for a given waveform type (e.g., each set of WUS parameters may include a quantity of timing hypotheses). The network entity 105-*a* may schedule transmission of WUSs 215 and determine wake-up groups of UEs 115 based on the reported timing hypothesis capabilities of the UE 115-*a*. For example, the network entity 105-*a* may estimate an ability of the UE 115-*a* to adjust to slight differences in timing based on the indicated quantity of timing hypotheses.

The network entity 105-*a* may determine potential WUSs 215 and corresponding waveform types which may be supported (e.g., received and decoded) by the UE 115-*a* based on the WUS capabilities of the UE 115-*a* and one or more other communication parameters associated with the wireless communications system 200. The network entity 105-*a* may transmit an indication 210 to the UE 115-*a* to indicate a set of potential WUSs 215 to be monitored by the UE 115-*a*. The network entity 105-*a* may transmit the indication 210 dynamically or semi-statically. The timing and contents of the indication 210 may be based on one or more communication parameters, such as a quantity of active UEs 115 in a cell supported by the network entity 105-*a*, a quantity of available resources in the cell, a quantity of WUSs 215, one or more conditions associated with the UE 115-*a* (e.g., SNR), one or more conditions associated with other UEs 115, or any combination thereof. The network entity 105-*a* may transmit the indication 210 via a downlink message, such as a DCI message, an RRC message, a MAC-CE, or some other physical downlink shared channel (PDSCH) or physical downlink control channel (PDCCH) message. The indication 210 may indicate the set of potential WUSs 215 to be monitored during a time period, such as when the UE 115-*a* is in a sleep or low power mode of operation (e.g., during uSleep). Each WUS 215 in the set may be specified by sequence parameters, time slots, and frequency positions to be monitored by the UE 115-*a*. In some examples, each element (e.g., each WUS 215) included in the set may be associated with a respective UE 115 or a respective group of UEs 115, which may be referred to as a wake-up group in some aspects herein, as described in further detail elsewhere herein, including with reference to FIG. 3.

The UE 115-*a* may receive the indication 210 and monitor for at least one WUS 215 from the set of WUSs 215 included in the indication 210. For example, the UE 115-*a* may monitor the sequence parameters, time slots, and frequency positions indicated via the indication 210 for a WUS 215. The UE 115-*a* may use the wake-up radio transceiver 225 to monitor for and receive a WUS 215. The UE 115-*a* may transition from a low power or sleep mode of operation to a higher power state or mode of operation in response to receiving the WUS 215. For example, the UE 115-*a* may active the main radio transceiver 230 for receiving subsequent communications in the higher power mode of operation in response to receiving the WUS 215.

The UE 115-*a* described herein may thereby transmit a capability message 205 indicating a set of one or more WUS parameters associated with one or more WUS 215 waveform types supported by the UE 115-*a*. The network entity 105-*a* may use the capabilities to select the WUS 215, determine a wake-up group of UEs, or both. By receiving the capability message 205 described herein, the network entity 105-*a* may select more accurate and reliable WUS waveform types in an efficient manner, which may support reduced complexity receivers, reduced channel coding complexity, and adjusted error tolerance while maintaining cell coverage and efficient usage of system resources.

Figure 3:
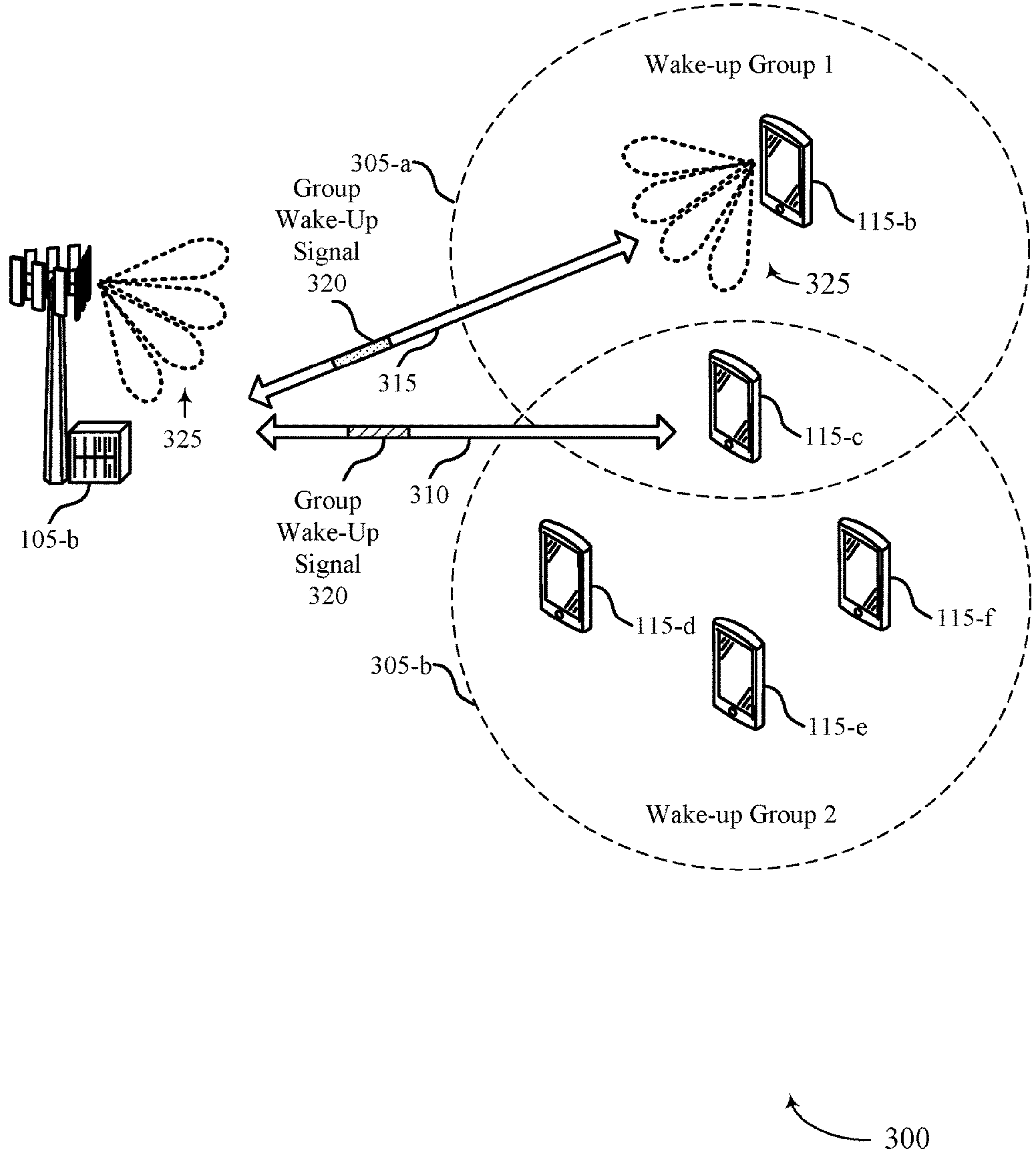
FIG. 3 illustrates an example of a wireless communications system that supports low power wake-up signaling capabilities in accordance with one or more aspects of the present disclosure.

FIG. 3 illustrates an example of a wireless communications system 300 that supports low power wake-up signaling capabilities in accordance with one or more aspects of the present disclosure. In some examples, the wireless communications system 300 may implement aspects of the wireless communications system 100 and the wireless communications system 200 or may be implemented by aspects of the wireless communications system 100 and the wireless communications system 200. For example, the wireless communications system 300 may include a UE 115-*b*, a UE 115-*c*, a UE 115-*d*, a UE 115-*e*, a UE 115-*f*, and a network entity 105-*b*, which may be examples of corresponding devices described herein. The wireless communications system 300 supports techniques for a group WUS 320. For example, the network entity 105-*b* may transmit an indication of WUSs 320 for the UEs 115 to monitor, and then the network entity 105-*b* may transmit a group WUS 320 to a wake-up group 305 of one or more UEs 115.

The network entity 105-*b* may communicate with each of the UEs 115 via a respective communication link. In the example of FIG. 3, the network entity 105-*b* may communicate with the UE 115-*b* via a communication link 315, with the UE 115-*c* via a communication link 310, and with the other UEs 115-*d*, 115-*e*, and 115-*f* via other respective communication links (not pictured in FIG. 3 for clarity). The network entity 105-*b* and each of the UEs 115 in the wireless communications system 300 may transmit and receive wireless communications using a set of one or more beams 325, which may represent examples of the beams 220 described with reference to FIG. 2. It is to be understood that each of the UEs 115-*b*, 115-*c*, 115-*d*, 115-*e*, and 115-*f* may support a respective set of one or more beams 325 for communications, although not pictured in FIG. 3 for clarity.

The network entity 105-*b* may define the wake-up groups 305 and assign one or more UEs 115 to each wake-up group 305. The network entity 105-*a* may receive capability messages from each UE 115. The capability messages may represent examples of the capability message 205 described with reference to FIG. 2. For example, the capability messages may indicate a quantity of WUS waveform types each UE 115 may support, and one or more other WUS waveform parameters associated with each of the UEs 115. The WUS waveform parameters may include sequence length in the time domain, a quantity of difference sequences the UE 115 is capable of monitoring simultaneously, a quantity of frequency domain allocation positions the UE 115 is capable of monitoring simultaneously, a quantity of time domain hypotheses per sequence, or any combination thereof, as described with reference to FIG. 2.

The network entity 105-*b* may determine which UEs 115 to include in each wake-up group 305 based on one or more WUS capabilities of the UEs 115 being similar, one or more communication parameters associated with the UEs 115 being similar, or any combination thereof. For example, the network entity 105-*a* may determine a set of UEs 115 that share or support similar communication parameters or conditions, such as similar downlink beams 325 that are activated for communications at the UEs 115, similar link conditions at the UEs 115, similar waveform types supported by the UEs 115, similar scheduling parameters, similar application-related parameters, other similar parameters, or any combination thereof. For example, if a similar downlink beam of the set of downlink beams 325 at the UE 115-*b* and the UE 115-*c* is activated for communications, the network entity 105-*b* may determine that the UE 115-*b* and the UE 115-*c* may support similar WUS transmission parameters. In some examples, a first downlink beam 325 that is activated at the UE 115-*b* may be similar to a second downlink beam 325 that is activated at the UE 115-*c* if the first and second downlink beams 325 are the same beams (e.g., associated with a same index or indication state), if the first and second downlink beams 325 are quasi co-located (QCLed), if the first and second downlink beams 325 are associated with a same transmission configuration indicator (TCI) state, if the first and second downlink beams 325 are configured with similar beamforming parameters (e.g., a similar angle, width, direction, or other parameters), if the first and second downlink beams 325 are contiguous in a spatial domain (e.g., if angles associated with the first and second beams are within an angular range of one another), if there are some other similarities between configurations of the first and second beams 325, or any combination thereof. Additionally, or alternatively, the network entity 105-*a* may assign the one or more UEs 115 to a respective wake-up group 305 based on WUS capabilities of the UEs 115 (e.g., supported sequences, sequence lengths, time resources, frequency resources, or the like).

In the example of FIG. 3, the UE 115-*b* and the UE 115-*c* may transmit capability messages to the network entity 105-*b* that indicate similar WUS waveform types are supported by the UEs 115-*b* and 115-*c*. Additionally, or alternatively, downlink beams 325 that are activated for communications by both the UE 115-*b* and the UE 115-*c* with the network entity 105-*b* may be similar, or link conditions measured by both the UE 115-*b* and the UE 115-*c* may be similar. As such, the network entity 105-*b* may determine that the UE 115-*b* and the UE 115-*c* may be assigned to a same wake-up group 305-*a* (e.g., wake-up group 1). Similarly, the UE 115-*c*, the UE 115-*d*, the UE 115-*e*, and the UE 115-*f* may be assigned to the wake-up group 305-*b* (e.g., wake-up group 2) based on similar WUS capabilities or conditions.

The network entity 105-*b* may transmit a single group WUS 320 to all UEs 115 in a same wake-up group 305 based on the similar WUS capabilities and conditions. That is, a single group WUS 320 may wake up multiple UEs 115. For example, the network entity 105-*b* may transmit a single group WUS 320 to the UE 115-*c* and the UE 115-*b* in the wake-up the group 305-*a*. The group WUS 320 may be transmitted via a broadcast transmission to each of the UEs 115 in the wake-up group 305-*a*. Although not illustrated in FIG. 3, the network entity 105-*b* may similarly transmit a single group WUS 320 to all of the UEs 115-*c*, 115-*d*, UE 115-*e*, and 115-*f* in the wake-up group 305-*b*. By transmitting a single group WUS 320 to wake multiple UEs 115 (e.g., using a single common message), the network entity 105-*b* may refrain from transmitting multiple individual WUSs to each UE 115, which may reduce overhead, power consumption, and complexity, and may improve throughput and resource savings.

In some examples, before transmitting the group WUS 320, the network entity 105-*b* may transmit an indication, such as the indication 210 described with reference to FIG. 2, to each of the UEs 115 to indicate a set of potential group WUSs 320 for the UEs 115 to monitor. The indication may include a set of parameters that define waveform types and waveform parameters for each of the potential group WUSs 320. The UEs 115 may monitor for the group WUS 320 based on the indication. Each WUS 320 included in the indication may be associated with a respective wake-up group 305.

In some examples, a UE 115 may be assigned to two or more wake-up groups 305. For example, the UE 115-*c* may be assigned to both the wake-up group 305-*a* and the wake-up group 305-*b*. The network entity 105-*b* may assign the UE 115-*c* to multiple wake-up groups 305 to improve a tradeoff between a probability that the UE 115-*c* is woken up in error (e.g., a false alarm rate) and a quantity of resources used for a wake-up mechanism. Although the wake-up groups 305-*a* and 305-*b* illustrated in FIG. 3 include two or more UEs 115, it is to be understood that, in some examples, a wake-up group 305 may include a single UE 115, or any other quantity of UEs 115.

The network entity 105-*b* described herein may thereby assign one or more UEs 115 to a wake-up group 305 and allocate unique WUS parameters to each wake-up group. The network entity 105-*b* may transmit a single group WUS 320 to all UEs 115 in each wake-up group, which may reduce overhead and improve resource utilization while maintaining reliability of the wake-up mechanism.

Figure 4:
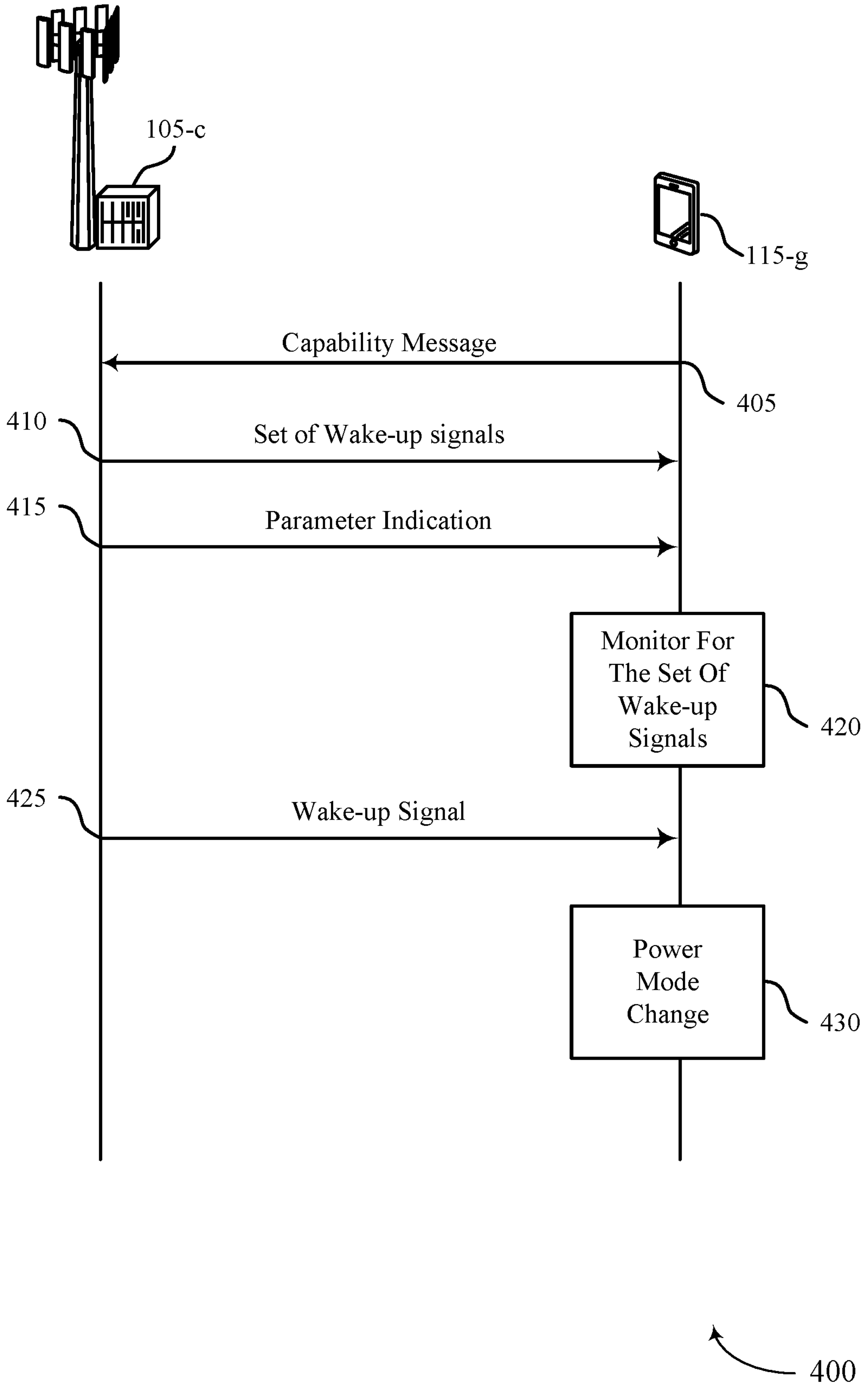
FIG. 4 illustrates an example of a process flow that supports low power wake-up signaling capabilities in accordance with one or more aspects of the present disclosure.

FIG. 4 illustrates an example of a process flow 400 that supports low power wake-up signaling capabilities in accordance with one or more aspects of the present disclosure. In some examples, the process flow 400 may implement or may be implemented by aspects of the wireless communications system 100, the wireless communications system 200, and the wireless communications system 300. For example, the process flow 400 may include a UE 115-*g* and a network entity 105-*c*, which may be examples of corresponding devices described herein.

In the following description of the process flow 400, the operations between the UE 115-*g* and the network entity 105-*c* may be performed in different orders or at different times. Some operations may also be left out of the process flow 400, or other operations may be added. Although the UE 115-*g* and the network entity 105-*c* are shown performing the operations of the process flow 400, some aspects of some operations may also be performed by one or more other wireless devices.

At 405, the UE 115-*g* may transmit a capability message to the network entity 105-*c*. The capability message may indicate a set of one or more WUS parameters associated with one or more WUS waveform types that are supported by the UE 115-*g*. In some examples, the one or more WUS parameters may include a respective sequence length supported by the UE 115-*g* for each WUS waveform type of the one or more WUS waveform types. The respective sequence lengths may each correspond to a respective quantity of time-domain symbols included in a respective WUS waveform type (e.g., a quantity of OFDM symbols in an OFDM waveform type, or a quantity of OOK symbols in an OOK waveform type, or the like). In some examples, the one or more WUS parameters may include a quantity of waveform sequences that the UE 115-*g* is capable of concurrently receiving within overlapping frequency resources. Each waveform sequence of the quantity may correspond to a respective sequence of one or more bit values.

In some examples, the one or more WUS parameters may include a quantity of frequency domain allocation positions that the UE 115-*g* is capable of concurrently monitoring for a WUS waveform type. Additionally, or alternatively, the one or more WUS parameters may include a respective quantity of time domain hypotheses supported by the UE 115-*g* for each WUS waveform type of the one or more WUS waveform types that are supported by the UE 115-*g*. The respective quantities of time domain hypotheses may each correspond to a respective quantity of time positions that the UE 115-*g* is capable of monitoring for a WUS waveform of a corresponding WUS waveform type. The one or more WUS waveform types may include one or more OFDM waveform types, one or more OOK types, or any combination thereof.

At 410, the network entity 105-*c* may transmit an indication of a set of WUSs to the UE 115-*g*. The network entity 105-*c* may determine the set of WUSs based on the respective set of one or more WUS parameters and the one or more WUS waveform types that are supported by the UE 115-*g*. In some examples, the UE 115-*g* may be included in one or more groups of UEs. Each group of the one or more groups may include the UE 115-*g* and at least one other UE based on the at least one other UE also supporting at least some of the respective sets of one or more WUS parameters and the one or more WUS waveform types that are supported by the UE 115-*g*, as described in further detail elsewhere herein, including with reference to FIG. 3. In such cases, the set of WUSs may include a respective group WUS for each of the one or more groups of UEs.

At 415, in some examples, the network entity 105-*c* may transmit a parameter indication to the UE 115-*g*. The parameter indication may indicate a respective set of sequence parameters associated with each WUS of the set of WUSs, a respective frequency position associated with each WUS of the set of WUSs, a time slot associated with each WUS, or any combination thereof. In some examples, the network entity 105-*c* may transmit a single message that indicates the set of WUSs and the parameters associated with each of the WUSs.

At 420, the UE 115-*g* may monitor, while operating in a low power mode (e.g., using a wake-up radio transceiver or some other low power transceiver, as described with reference to FIG. 2), for at least one WUS of the set of WUSs based on the indication of the set of WUSs. In some examples, the UE 115-*b* may monitor for the at least one WUS of the set of WUSs based on the respective sets of sequence parameters, the respective time slots, the respective frequency positions, or any combination thereof, as conveyed via the parameter indication.

At 425, the network entity 105-*c* may transmit at least one WUS from the set of WUSs to the UE 115-*g*. The UE 115-*g* may receive the WUS based on the monitoring.

At 430, the UE 115-*g* may transition from the lower power mode to a second power mode in response to receiving the WUS. The second power mode may be associated with relatively higher power consumption than the low power mode. For example, the second power mode may be associated with transmission and reception of data using a main radio transceiver of the UE 115-*g*, which may consume more power than a wake-up radio transceiver of the UE 115-*g* associated with the low power mode, as described with reference to FIG. 2.

The network entity 105-*c* and the UE 115-*g* described herein may thereby exchange capability signaling indicative of wake-up signaling capabilities of the UE 115-*g*. By receiving an indication of one or more waveform types supported by the UE 115-*g* and one or more parameters associated with each waveform type, the network entity 105-*c* may generate or design WUSs for transmission to the UE 115-*g* with reduced complexity and improved reliability as compared to systems in which the network entity 105-*c* may not receive the capability signaling.

Figure 5:
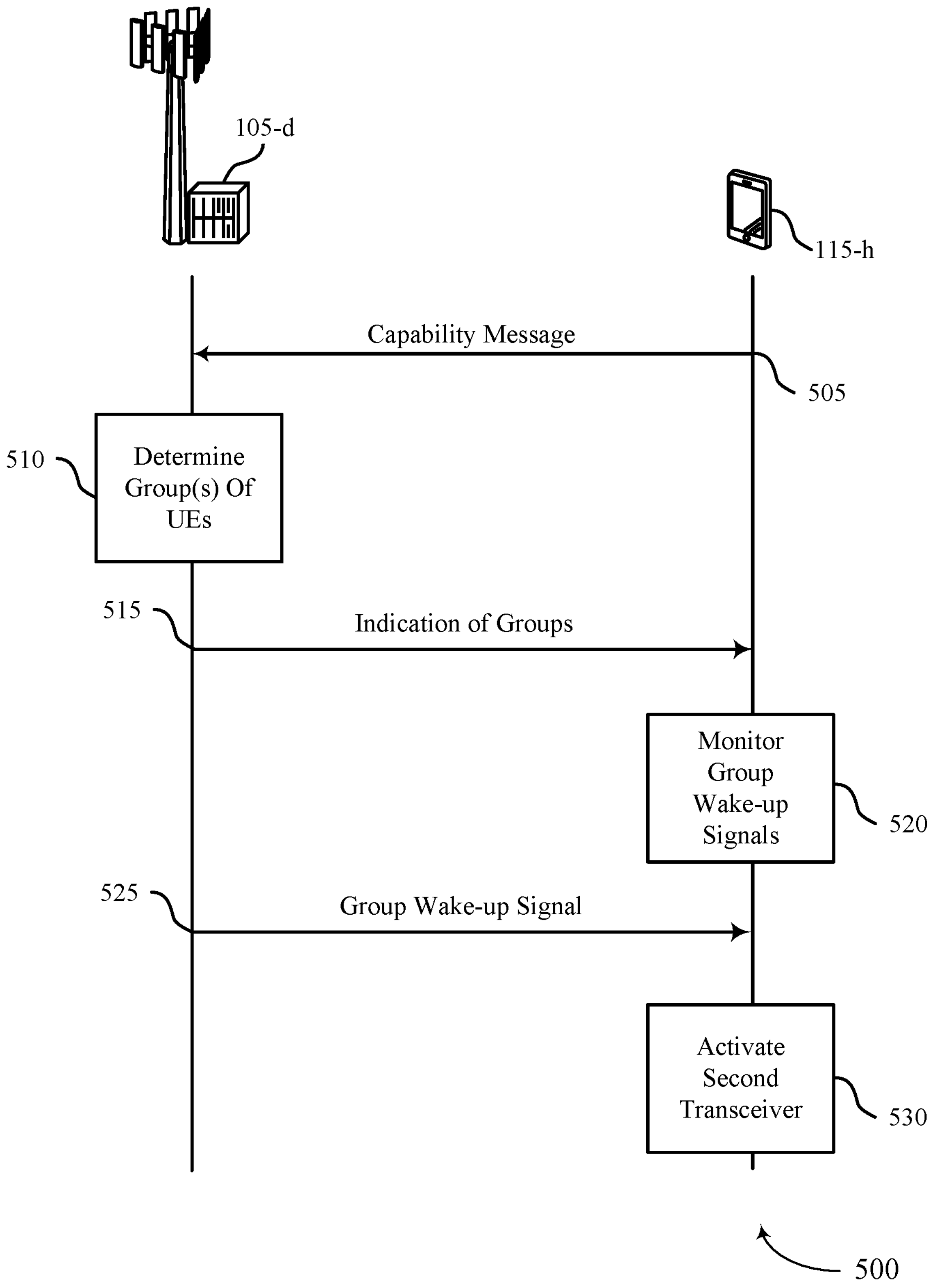
FIG. 5 illustrates an example of a process flow that supports low power wake-up signaling capabilities in accordance with one or more aspects of the present disclosure.

FIG. 5 illustrates an example of a process flow 500 that supports low power wake-up signaling capabilities in accordance with one or more aspects of the present disclosure. In some examples, the process flow 500 may implement aspects of, or be implemented by, the wireless communications system 100, the wireless communications system 200, the wireless communications system 300, and the process flow 400. For example, the process flow 500 may include a UE 115-*h* and a network entity 105-*d*, which may be examples of corresponding devices described herein.

In the following description of the process flow 500, the operations between the UE 115-*h* and the network entity 105-*d* may be performed in different orders or at different times. Some operations may also be left out of the process flow 500, or other operations may be added. Although the UE 115-*h* and the network entity 105-*d* are shown performing the operations of the process flow 500, some aspects of some operations may also be performed by one or more other wireless devices.

At 505, in some examples, the UE 115-*h* may transmit a capability message to the network entity 105-*d*. The capability message may represent an example of the capability message as described with reference to FIGS. 2-4. The capability message may indicate one or more WUS waveform types and one or more sets of WUS waveform parameters that are supported by the UE 115-*h*. In some examples, the network entity 105-*d* may receive one or more second capability messages from one or more second UEs different than the UE 115-*h* (not pictured in FIG. 5). The second capability messages may each indicate a second respective set of one or more WUS parameters associated with one or more second WUS waveform types that are supported by the second UE.

At 510, the network entity 105-*d* may determine one or more groups of UEs 115, which may be referred to as wake-up groups in some examples herein. The groups of UEs 115 may represent examples of the wake-up groups 305 described with reference to FIG. 3. The network entity 105-*d* may select which UEs 115 to include in each group based on a set of WUS waveform parameters being common to the UEs 115. The WUS waveform parameters may include, for example, downlink beams used for communications by the UEs 115, link conditions associated with communications at the UEs 115, applications executed by the UEs 115, or any combination thereof.

The network entity 105-*d* may determine the groups of UEs based on the respective set of one or more WUS parameters and the one or more WUS waveform types that are supported by the UE 115-*h*. The UE 115-*h* may support one or more first sets of WUS waveform parameters and the second UE may support one or more second sets of WUS waveform parameters. The first sets and second sets may partially overlap, and the overlapping parameters may determine the set of WUS waveform parameters that are common to the UEs in the group. Determining the group of UEs may be based on the respective set of one or more WUS parameters and the one or more WUS waveform types that are supported the UE 115-*h* and the second UE. In some examples, the UE 115-*h* may be included in multiple groups. For example, the UE 115-*h* may be included in the group of UEs and one or more second groups of UEs based on one or more sets of WUS waveform parameters that are supported by the UE 115-*h*.

At 515, the network entity 105-*d* may transmit an indication of the groups determined at 510 to the UE 115-*h*. In some examples, the network entity 105-*d* may transmit an indication of a set of WUSs to be monitored by the UEs 115 in each group.

At 520, the UE 115-*h* may monitor for at least one group WUS. The UE 115-*d* may use a first transceiver associated with a first mode of operation to monitor for the group WUS. In some examples, at 515, the UE 115-*h* may receive an indication of a set of group WUSs, such as the indication 210 described with reference to FIG. 2, and the UE 115-*h* may monitor for the WUS in accordance with the indication.

At 525, the network entity 105-*d* may transmit a group WUS to the UE 115-*h*, and one or more other UEs 115 in a same wake-up group as the UE 115-*h*. The UE 115-*h* may receive the group WUS based on the monitoring. The group WUS may include a request for each UE of the group of UEs to transition from the first mode of operation to a second mode of operation. The network entity 105-*d* may transmit the group WUS based on determining the group of UEs.

At 530, the UE 115-*h* may activate, in response to receiving the group WUS, a second transceiver of the UE 115-*h* that is associated with the second mode of operation for the UE 115-*h*. The second transceiver may be associated with higher power consumption than the first transceiver of the UE 115-*h*. for example, the first transceiver may represent an example of a wake-up radio transceiver and the second transceiver may represent an example of a main radio transceiver, as described with reference to FIG. 2. In some examples, the network entity 105-*d* may transmit the group WUS to trigger the activation of the second transceiver of the UE 115-*h* and the other UEs 115 in the group (e.g., to wake up the UEs 115).

The network entity 105-*d* and the UE 115-*h* described herein may thereby exchange capability signaling indicative of group wake-up signaling capabilities of the UE 115-*h*. By receiving an indication of one or more waveform types supported by the UE 115-*h* and one or more other UEs 115 and one or more parameters associated with each waveform type, the network entity 105-*d* may generate or design group WUSs for transmission to the UE 115-*h* and the other UEs 115 in a same wake-up group with reduced complexity and improved reliability as compared to systems in which the network entity 105-*d* may not receive the capability signaling.

Figure 6:
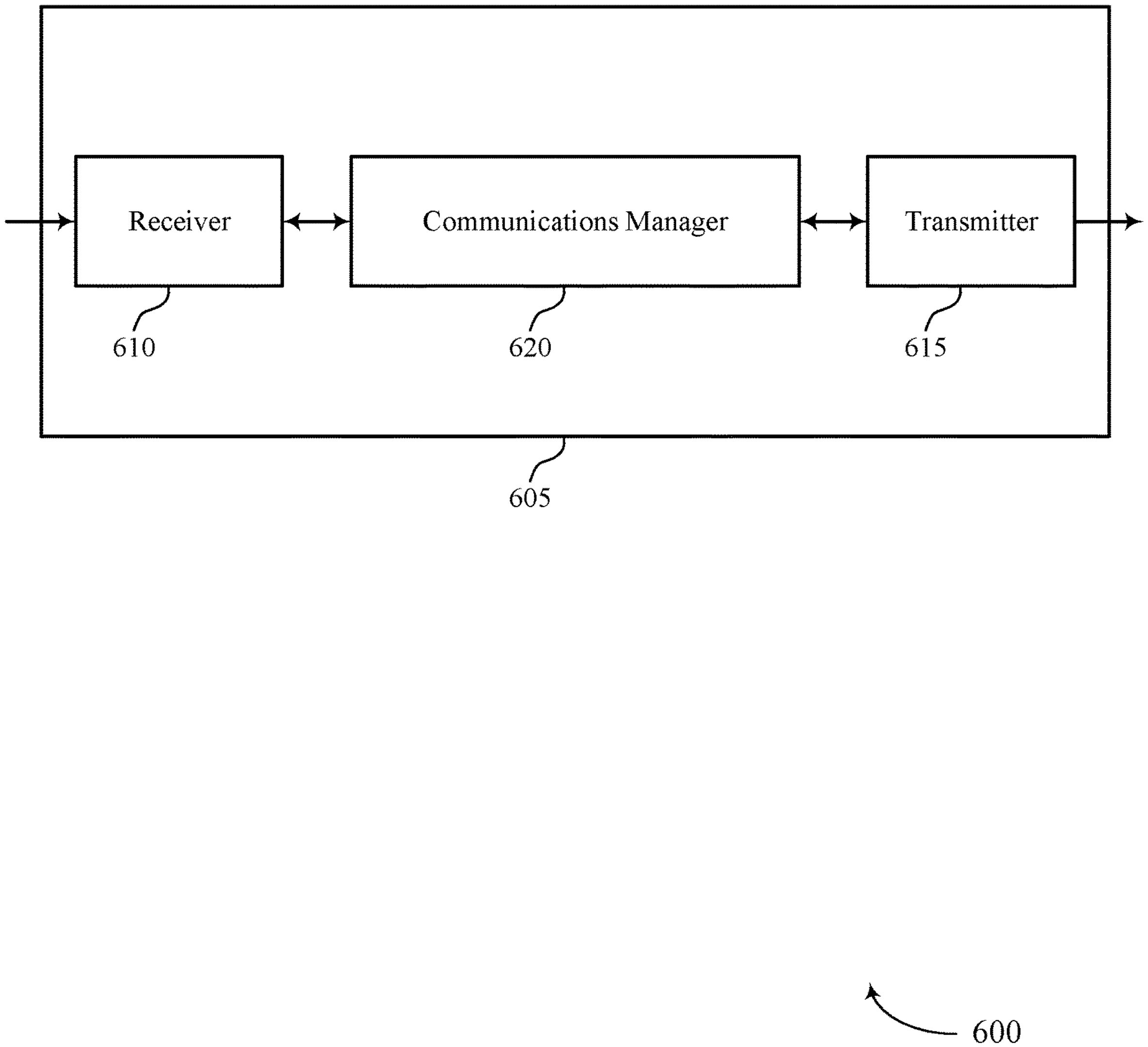
FIGS. 6 and 7 illustrate block diagrams of devices that support low power wake-up signaling capabilities in accordance with one or more aspects of the present disclosure.

FIG. 6 illustrates a block diagram 600 of a device 605 that supports low power wake-up signaling capabilities in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to low power wake-up signaling capabilities). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to low power wake-up signaling capabilities). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of low power wake-up signaling capabilities as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for transmitting a capability message that indicates a respective set of one or more WUS parameters associated with one or more WUS waveform types that are supported by the UE. The communications manager 620 may be configured as or otherwise support a means for receiving an indication of a set of WUSs to be monitored by the UE, the set of WUSs based on the respective set of one or more WUS parameters and the one or more WUS waveform types that are supported by the UE. The communications manager 620 may be configured as or otherwise support a means for monitoring, while operating in a low power mode, for at least one WUS of the set of WUSs based on the indication.

Additionally, or alternatively, the communications manager 620 may support wireless communications at a UE in accordance with examples as disclosed herein. For example, the communications manager 620 may be configured as or otherwise support a means for monitoring, using a first transceiver of the UE associated with a first mode of operation for the UE, for a group WUS. The communications manager 620 may be configured as or otherwise support a means for receiving the group WUS based on the monitoring, the group WUS including a request for each UE of a group of UEs to transition from the first mode of operation to a second mode of operation, where the group of UEs includes the UE and at least one other UE, and where the UEs in the group are included in the group based on a set of WUS waveform parameters being common to the UEs in the group. The communications manager 620 may be configured as or otherwise support a means for activating, in response to receiving the group WUS, a second transceiver of the UE associated with the second mode of operation for the UE, where the second transceiver is associated with higher power consumption than the first transceiver.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for low power wake-up signaling capabilities, which may support reduced processing, reduced power consumption, or more efficient utilization of communication resources, among other advantages.

Figure 7:
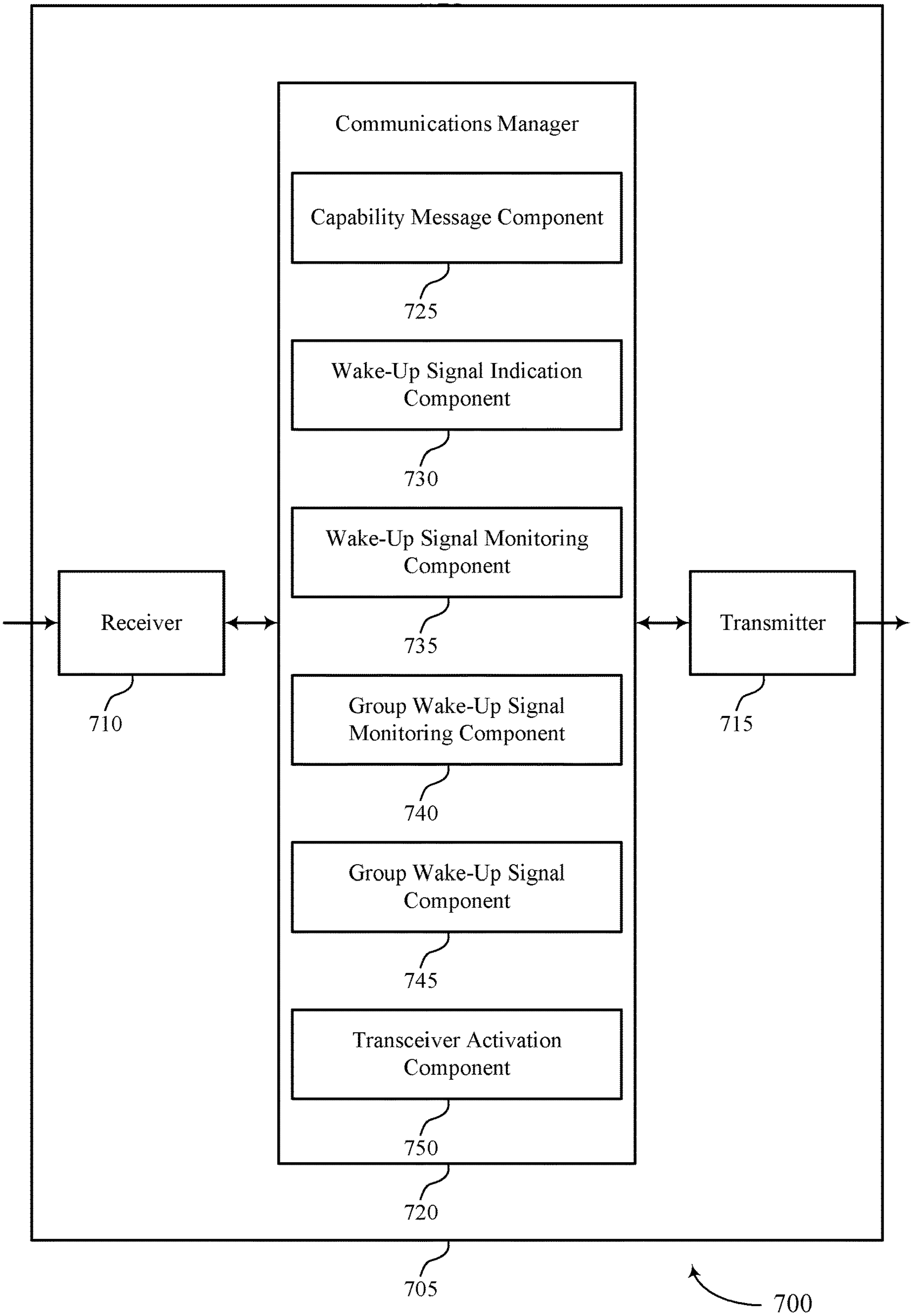

FIG. 7 illustrates a block diagram 700 of a device 705 that supports low power wake-up signaling capabilities in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to low power wake-up signaling capabilities). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to low power wake-up signaling capabilities). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of low power wake-up signaling capabilities as described herein. For example, the communications manager 720 may include a capability message component 725, a WUS indication component 730, a WUS monitoring component 735, a group WUS monitoring component 740, a group WUS component 745, a transceiver activation component 750, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The capability message component 725 may be configured as or otherwise support a means for transmitting a capability message that indicates a respective set of one or more WUS parameters associated with one or more WUS waveform types that are supported by the UE. The WUS indication component 730 may be configured as or otherwise support a means for receiving an indication of a set of WUSs to be monitored by the UE, the set of WUSs based on the respective set of one or more WUS parameters and the one or more WUS waveform types that are supported by the UE. The WUS monitoring component 735 may be configured as or otherwise support a means for monitoring, while operating in a low power mode, for at least one WUS of the set of WUSs based on the indication.

Additionally, or alternatively, the communications manager 720 may support wireless communications at a UE in accordance with examples as disclosed herein. The group WUS monitoring component 740 may be configured as or otherwise support a means for monitoring, using a first transceiver of the UE associated with a first mode of operation for the UE, for a group WUS. The group WUS component 745 may be configured as or otherwise support a means for receiving the group WUS based on the monitoring, the group WUS including a request for each UE of a group of UEs to transition from the first mode of operation to a second mode of operation, where the group of UEs includes the UE and at least one other UE, and where the UEs in the group are included in the group based on a set of WUS waveform parameters being common to the UEs in the group. The transceiver activation component 750 may be configured as or otherwise support a means for activating, in response to receiving the group WUS, a second transceiver of the UE associated with the second mode of operation for the UE, where the second transceiver is associated with higher power consumption than the first transceiver.

Figure 8:
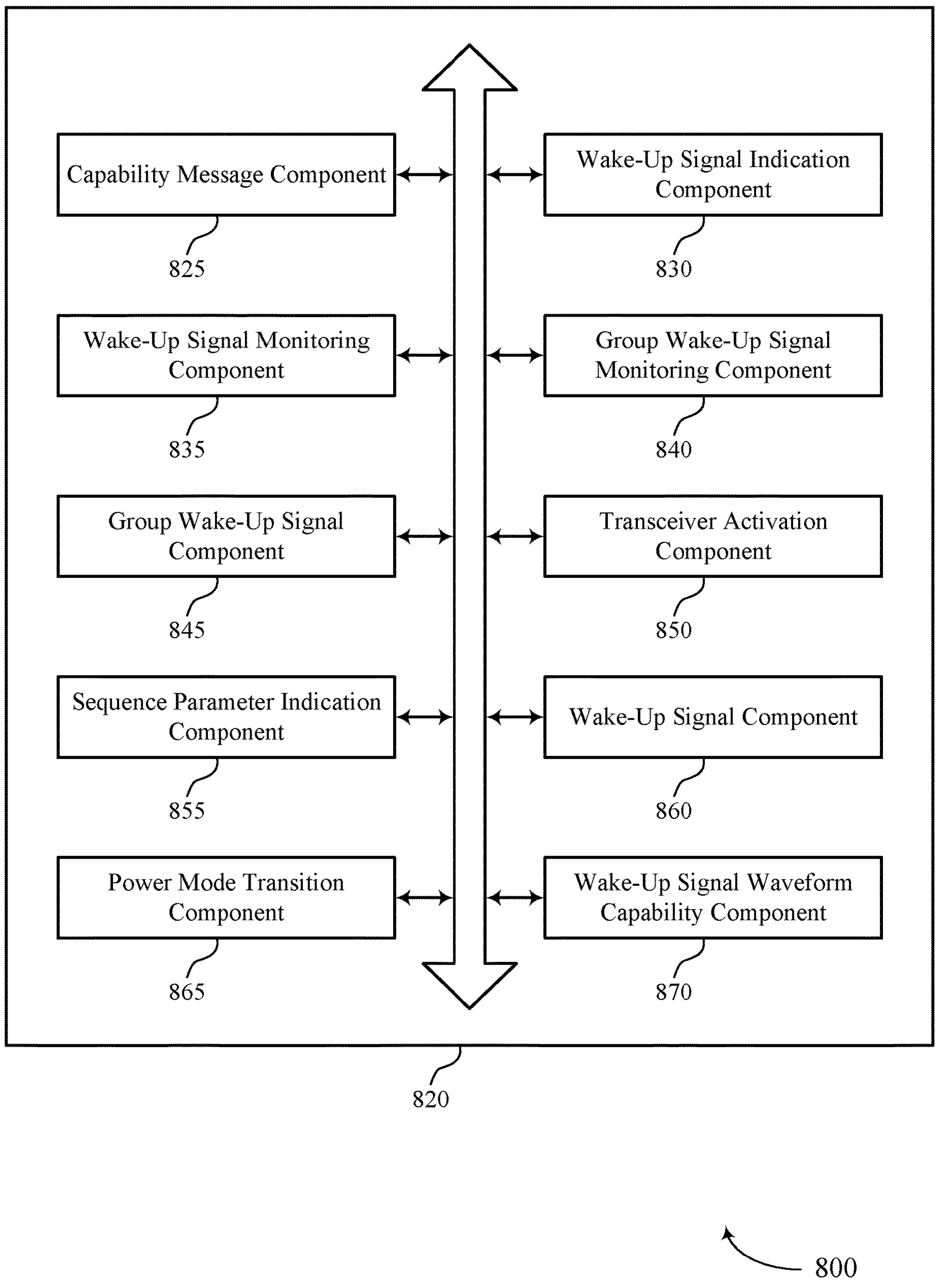
FIG. 8 illustrates a block diagram of a communications manager that supports low power wake-up signaling capabilities in accordance with one or more aspects of the present disclosure.

FIG. 8 illustrates a block diagram 800 of a communications manager 820 that supports low power wake-up signaling capabilities in accordance with one or more aspects of the present disclosure. The communications manager 820 may be an example of aspects of a communications manager 620, a communications manager 720, or both, as described herein. The communications manager 820, or various components thereof, may be an example of means for performing various aspects of low power wake-up signaling capabilities as described herein. For example, the communications manager 820 may include a capability message component 825, a WUS indication component 830, a WUS monitoring component 835, a group WUS monitoring component 840, a group WUS component 845, a transceiver activation component 850, a sequence parameter indication component 855, a WUS component 860, a power mode transition component 865, a WUS waveform capability component 870, or any combination thereof. Each of these components may communicate, directly or indirectly, with one another (e.g., via one or more buses).

The communications manager 820 may support wireless communications at a UE in accordance with examples as disclosed herein. The capability message component 825 may be configured as or otherwise support a means for transmitting a capability message that indicates a respective set of one or more WUS parameters associated with one or more WUS waveform types that are supported by the UE. The WUS indication component 830 may be configured as or otherwise support a means for receiving an indication of a set of WUSs to be monitored by the UE, the set of WUSs based on the respective set of one or more WUS parameters and the one or more WUS waveform types that are supported by the UE. The WUS monitoring component 835 may be configured as or otherwise support a means for monitoring, while operating in a low power mode, for at least one WUS of the set of WUSs based on the indication.

In some examples, the sequence parameter indication component 855 may be configured as or otherwise support a means for receiving an indication of a respective set of sequence parameters associated with each WUS of the set of WUSs, a respective frequency position associated with each WUS of the set of WUSs, a respective time slot associated with each WUS, or any combination thereof, where monitoring for the at least one WUS of the set of WUSs is based on the respective sets of sequence parameters, the respective frequency positions, the respective time slots, or any combination thereof.

In some examples, to support transmitting the capability message, the capability message component 825 may be configured as or otherwise support a means for transmitting an indication of a respective sequence length supported by the UE for each WUS waveform type of the one or more WUS waveform types that are supported by the UE, where the respective sequence lengths each include a respective quantity of time-domain symbols included in a respective WUS waveform type.

In some examples, to support transmitting the capability message, the capability message component 825 may be configured as or otherwise support a means for transmitting an indication of a quantity of waveform sequences that the UE is capable of concurrently receiving within overlapping frequency resources, where each waveform sequence of the quantity corresponds to a respective sequence of one or more bit values.

In some examples, to support transmitting the capability message, the capability message component 825 may be configured as or otherwise support a means for transmitting an indication of a quantity of frequency domain allocation positions that the UE is capable of concurrently monitoring for a WUS waveform.

In some examples, to support transmitting the capability message, the capability message component 825 may be configured as or otherwise support a means for transmitting an indication of a respective quantity of time domain hypotheses supported by the UE for each WUS waveform type of the one or more WUS waveform types that are supported by the UE, where the respective quantities of time domain hypotheses each correspond to a respective quantity of time positions that the UE is capable of monitoring for a WUS waveform of a corresponding WUS waveform type.

In some examples, the UE may be included in one or more groups of UEs, each group of the one or more groups including the UE and at least one other UE based on the at least one other UE also supporting at least some of the respective sets of one or more WUS parameters and the one or more WUS waveform types that are supported by the UE. In some examples, the set of WUSs may include a respective group WUS for each of the one or more groups of UEs.

In some examples, the WUS component 860 may be configured as or otherwise support a means for receiving a WUS from the set of WUSs based on the monitoring. In some examples, the power mode transition component 865 may be configured as or otherwise support a means for transitioning from the low power mode to a second power mode in response to receiving the WUS.

In some examples, the one or more WUS waveform types include one or more OFDM waveform types, one or more OOK waveform types, or any combination thereof.

Additionally, or alternatively, the communications manager 820 may support wireless communications at a UE in accordance with examples as disclosed herein. The group WUS monitoring component 840 may be configured as or otherwise support a means for monitoring, using a first transceiver of the UE associated with a first mode of operation for the UE, for a group WUS. The group WUS component 845 may be configured as or otherwise support a means for receiving the group WUS based on the monitoring, the group WUS including a request for each UE of a group of UEs to transition from the first mode of operation to a second mode of operation, where the group of UEs includes the UE and at least one other UE, and where the UEs in the group are included in the group based on a set of WUS waveform parameters being common to the UEs in the group. The transceiver activation component 850 may be configured as or otherwise support a means for activating, in response to receiving the group WUS, a second transceiver of the UE associated with the second mode of operation for the UE, where the second transceiver is associated with higher power consumption than the first transceiver.

In some examples, the WUS waveform capability component 870 may be configured as or otherwise support a means for transmitting a capability message that indicates one or more WUS waveform types and one or more sets of WUS waveform parameters that are supported by the UE, the one or more sets of WUS waveform parameters including the set of WUS waveform parameters that is common to the UEs in the group.

In some examples, the UEs in the group are included in the group based on downlink beams used for communications by the UEs. In some examples, the UEs in the group are included in the group based on link conditions associated with communications at the UEs. In some examples, the UEs in the group are included in the group based on applications executed by the UEs. In some examples, the UE is included in the group of UEs and one or more second groups of UEs based on one or more sets of WUS waveform parameters that are supported by the UE.

Figure 9:
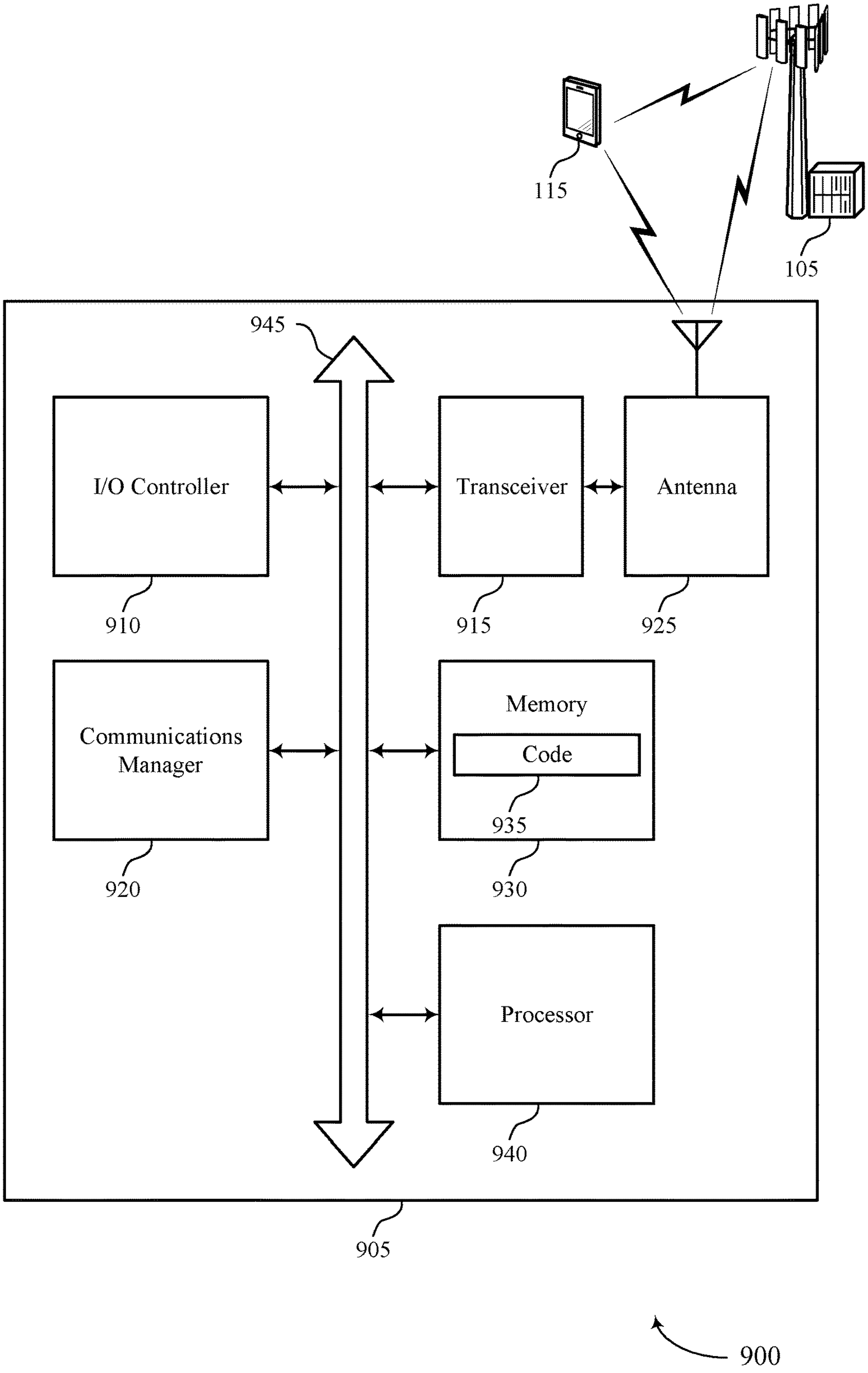
FIG. 9 illustrates a diagram of a system including a device that supports low power wake-up signaling capabilities in accordance with one or more aspects of the present disclosure.

FIG. 9 illustrates a diagram of a system 900 including a device 905 that supports low power wake-up signaling capabilities in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting low power wake-up signaling capabilities). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for transmitting a capability message that indicates a respective set of one or more WUS parameters associated with one or more WUS waveform types that are supported by the UE. The communications manager 920 may be configured as or otherwise support a means for receiving an indication of a set of WUSs to be monitored by the UE, the set of WUSs based on the respective set of one or more WUS parameters and the one or more WUS waveform types that are supported by the UE. The communications manager 920 may be configured as or otherwise support a means for monitoring, while operating in a low power mode, for at least one WUS of the set of WUSs based on the indication.

Additionally, or alternatively, the communications manager 920 may support wireless communications at a UE in accordance with examples as disclosed herein. For example, the communications manager 920 may be configured as or otherwise support a means for monitoring, using a first transceiver of the UE associated with a first mode of operation for the UE, for a group WUS. The communications manager 920 may be configured as or otherwise support a means for receiving the group WUS based on the monitoring, the group WUS including a request for each UE of a group of UEs to transition from the first mode of operation to a second mode of operation, where the group of UEs includes the UE and at least one other UE, and where the UEs in the group are included in the group based on a set of WUS waveform parameters being common to the UEs in the group. The communications manager 920 may be configured as or otherwise support a means for activating, in response to receiving the group WUS, a second transceiver of the UE associated with the second mode of operation for the UE, where the second transceiver is associated with higher power consumption than the first transceiver.

By including or configuring the communications manager 920 in accordance with examples as described herein, the device 905 may support techniques for low power wake-up signaling capabilities, which may result in improved communication reliability, reduced latency, improved user experience related to reduced processing, reduced power consumption, more efficient utilization of communication resources, improved coordination between devices, longer battery life, or improved utilization of processing capability, among other advantages.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of low power wake-up signaling capabilities as described herein, or the processor 940 and the memory 930 may be otherwise configured to perform or support such operations.

Figure 10:
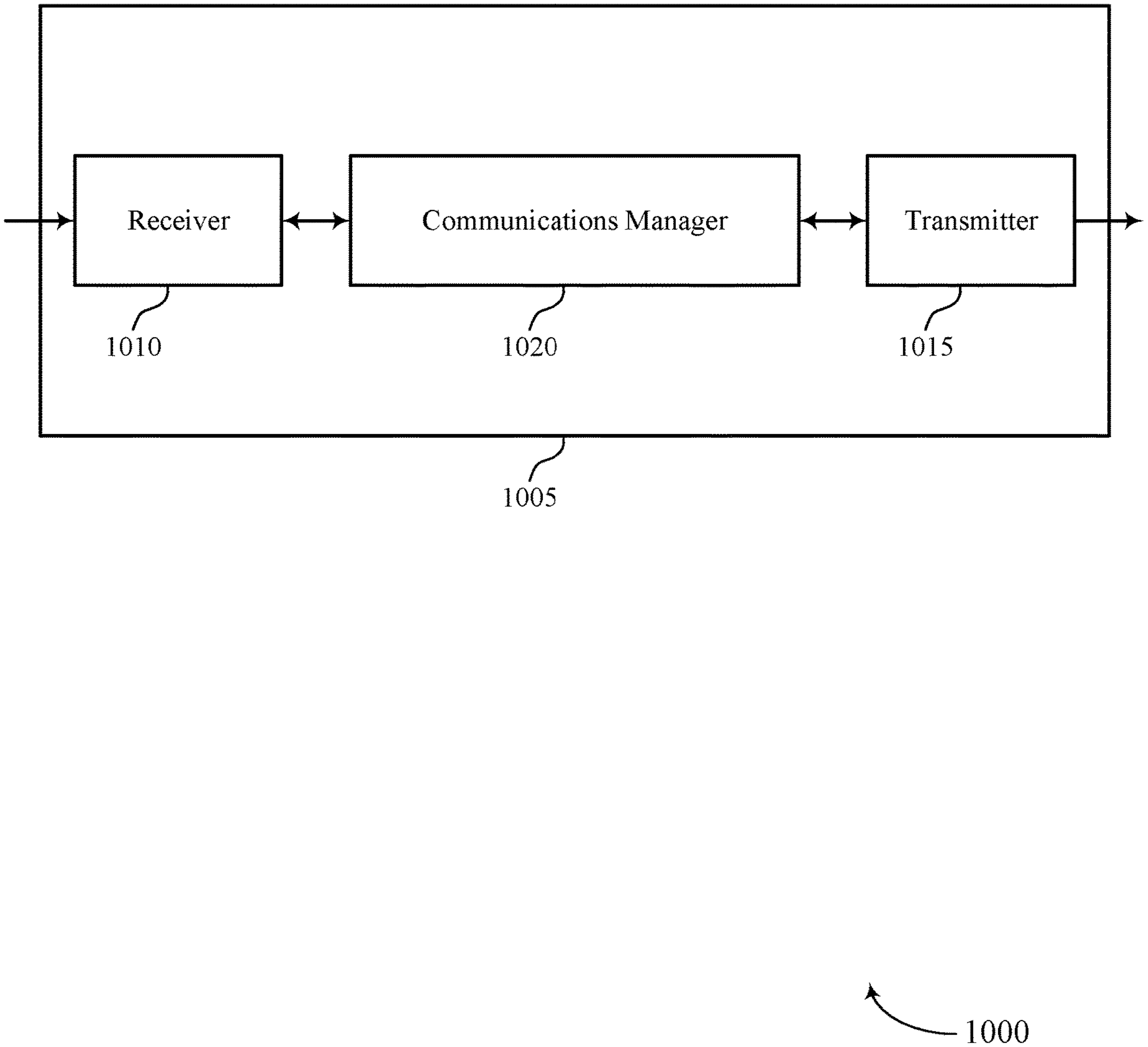
FIGS. 10 and 11 illustrate block diagrams of devices that support low power wake-up signaling capabilities in accordance with one or more aspects of the present disclosure.

FIG. 10 illustrates a block diagram 1000 of a device 1005 that supports low power wake-up signaling capabilities in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of low power wake-up signaling capabilities as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for receiving a capability message that indicates a respective set of one or more WUS parameters associated with one or more WUS waveform types that are supported by a UE in communication with the network entity. The communications manager 1020 may be configured as or otherwise support a means for transmitting an indication of a set of WUSs to be monitored by the UE while operating in a low power mode, the set of WUSs based on the respective set of one or more WUS parameters and the one or more WUS waveform types that are supported by the UE. The communications manager 1020 may be configured as or otherwise support a means for transmitting at least one WUS of the set of WUSs based on the indication.

Additionally, or alternatively, the communications manager 1020 may support wireless communications at a network entity in accordance with examples as disclosed herein. For example, the communications manager 1020 may be configured as or otherwise support a means for determining a group of UEs, where the UEs are included in the group based on a set of WUS waveform parameters being common to the UEs. The communications manager 1020 may be configured as or otherwise support a means for transmitting a group WUS based on determining the group of UEs, the group WUS including a request for each UE of the group of UEs to transition from a first mode of operation to a second mode of operation. The communications manager 1020 may be configured as or otherwise support a means for transmitting a communication to at least one UE of the group of UEs to activate a second transceiver of the UE, where a second transceiver power of the second transceiver is associated with higher power consumption than a first transceiver of the UE that is associated with the first mode of operation.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for low power wake-up signaling capabilities, which may provide for reduced processing, reduced power consumption, or more efficient utilization of communication resources, among other advantages.

Figure 11:
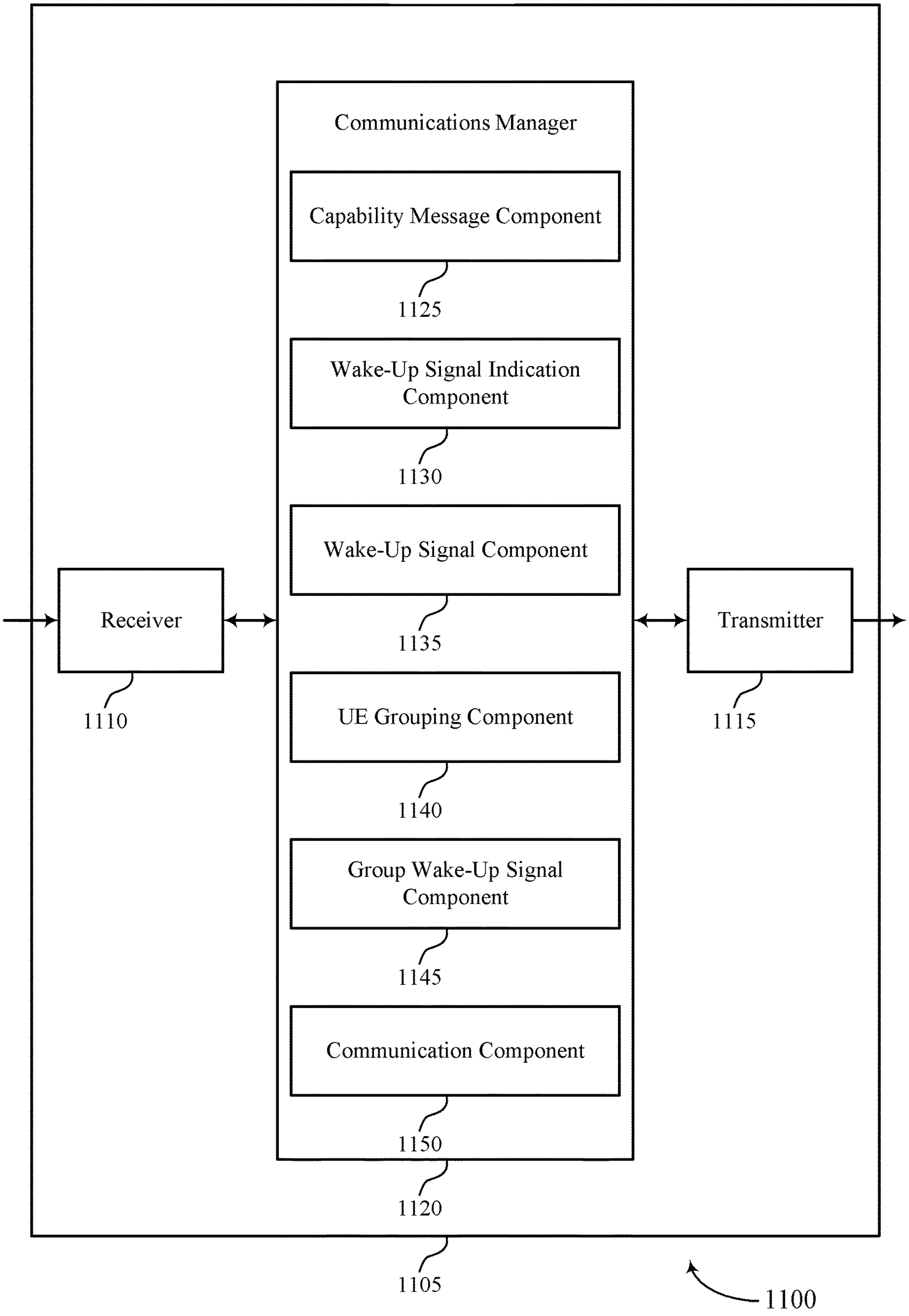

FIG. 11 illustrates a block diagram 1100 of a device 1105 that supports low power wake-up signaling capabilities in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of low power wake-up signaling capabilities as described herein.

For example, the communications manager 1120 may include a capability message component 1125, a WUS indication component 1130, a WUS component 1135, a UE grouping component 1140, a group WUS component 1145, a communication component 1150, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The capability message component 1125 may be configured as or otherwise support a means for receiving a capability message that indicates a respective set of one or more WUS parameters associated with one or more WUS waveform types that are supported by a UE in communication with the network entity. The WUS indication component 1130 may be configured as or otherwise support a means for transmitting an indication of a set of WUSs to be monitored by the UE while operating in a low power mode, the set of WUSs based on the respective set of one or more WUS parameters and the one or more WUS waveform types that are supported by the UE. The WUS component 1135 may be configured as or otherwise support a means for transmitting at least one WUS of the set of WUSs based on the indication.

Additionally, or alternatively, the communications manager 1120 may support wireless communications at a network entity in accordance with examples as disclosed herein. The UE grouping component 1140 may be configured as or otherwise support a means for determining a group of UEs, where the UEs are included in the group based on a set of WUS waveform parameters being common to the UEs. The group WUS component 1145 may be configured as or otherwise support a means for transmitting a group WUS based on determining the group of UEs, the group WUS including a request for each UE of the group of UEs to transition from a first mode of operation to a second mode of operation. The communication component 1150 may be configured as or otherwise support a means for transmitting a communication to at least one UE of the group of UEs to activate a second transceiver of the UE, where a second transceiver power of the second transceiver is associated with higher power consumption than a first transceiver of the UE that is associated with the first mode of operation.

Figure 12:
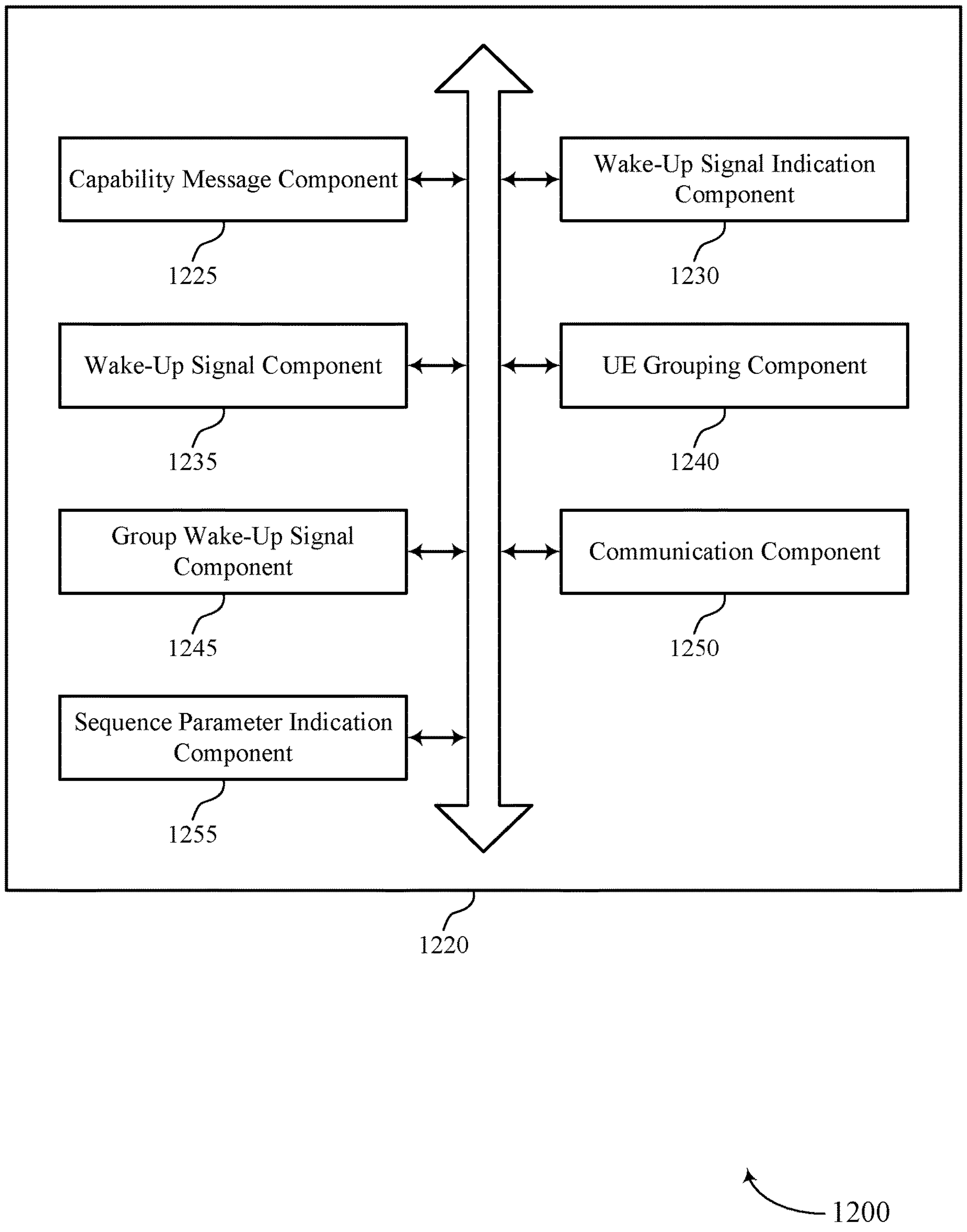
FIG. 12 illustrates a block diagram of a communications manager that supports low power wake-up signaling capabilities in accordance with one or more aspects of the present disclosure.

FIG. 12 illustrates a block diagram 1200 of a communications manager 1220 that supports low power wake-up signaling capabilities in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of low power wake-up signaling capabilities as described herein. For example, the communications manager 1220 may include a capability message component 1225, a WUS indication component 1230, a WUS component 1235, a UE grouping component 1240, a group WUS component 1245, a communication component 1250, a sequence parameter indication component 1255, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The capability message component 1225 may be configured as or otherwise support a means for receiving a capability message that indicates a respective set of one or more WUS parameters associated with one or more WUS waveform types that are supported by a UE in communication with the network entity. The WUS indication component 1230 may be configured as or otherwise support a means for transmitting an indication of a set of WUSs to be monitored by the UE while operating in a low power mode, the set of WUSs based on the respective set of one or more WUS parameters and the one or more WUS waveform types that are supported by the UE. The WUS component 1235 may be configured as or otherwise support a means for transmitting at least one WUS of the set of WUSs based on the indication.

In some examples, the sequence parameter indication component 1255 may be configured as or otherwise support a means for receiving an indication of a respective set of sequence parameters associated with each WUS of the set of WUSs, a respective frequency position associated with each WUS of the set of WUSs, a respective time slot associated with each WUS, or any combination thereof, where transmitting the at least one WUS is based on the respective sets of sequence parameters, the respective frequency positions, the respective time slots, or any combination thereof.

In some examples, to support receiving the capability message, the capability message component 1225 may be configured as or otherwise support a means for receiving an indication of a respective sequence length supported by the UE for each WUS waveform type of the one or more WUS waveform types that are supported by the UE, where the respective sequence lengths each include a respective quantity of time-domain symbols included in a respective WUS waveform type.

In some examples, to support receiving the capability message, the capability message component 1225 may be configured as or otherwise support a means for receiving an indication of a quantity of waveform sequences that the UE is capable of concurrently receiving within overlapping frequency resources, where each waveform sequence of the quantity corresponds to a respective sequence of one or more values.

In some examples, to support receiving the capability message, the capability message component 1225 may be configured as or otherwise support a means for receiving an indication of a quantity of frequency domain allocation positions that the UE is capable of concurrently monitoring for a WUS waveform.

In some examples, to support receiving the capability message, the capability message component 1225 may be configured as or otherwise support a means for receiving an indication of a respective quantity of time domain hypotheses supported by the UE for each WUS waveform type of the one or more WUS waveform types that are supported by the UE, where the respective quantities of time domain hypotheses each correspond to a respective quantity of time positions that the UE is capable of monitoring for a WUS waveform of a corresponding WUS waveform type.

In some examples, the capability message component 1225 may be configured as or otherwise support a means for receiving a second capability message from a second UE that indicates a second respective set of one or more WUS parameters associated with one or more second WUS waveform types that are supported by the second UE. In some examples, the UE grouping component 1240 may be configured as or otherwise support a means for determining a group of UEs including the UE and the second UE based on the respective set of one or more WUS parameters and the one or more WUS waveform types that are supported by the UE at least partially overlapping with the second respective set of one or more WUS parameters and the one or more second WUS waveform types that are supported by the second UE, where the set of WUSs includes a respective group WUS for the group of UEs.

In some examples, the WUS component 1235 may be configured as or otherwise support a means for determining the set of WUSs based on the respective set of one or more WUS parameters and the one or more WUS waveform types that are supported by the UE.

In some examples, the one or more WUS waveform types include one or more OFDM waveform types, one or more OOK waveform types, or any combination thereof.

Additionally, or alternatively, the communications manager 1220 may support wireless communications at a network entity in accordance with examples as disclosed herein. The UE grouping component 1240 may be configured as or otherwise support a means for determining a group of UEs, where the UEs are included in the group based on a set of WUS waveform parameters being common to the UEs. The group WUS component 1245 may be configured as or otherwise support a means for transmitting a group WUS based on determining the group of UEs, the group WUS including a request for each UE of the group of UEs to transition from a first mode of operation to a second mode of operation. The communication component 1250 may be configured as or otherwise support a means for transmitting a communication to at least one UE of the group of UEs to activate a second transceiver of the UE, where a second transceiver power of the second transceiver is associated with higher power consumption than a first transceiver of the UE that is associated with the first mode of operation.

In some examples, the capability message component 1225 may be configured as or otherwise support a means for receiving, from the UE of the group of UEs, a first capability message that indicates one or more first WUS waveform types and one or more first sets of WUS waveform parameters that are supported by the UE. In some examples, the capability message component 1225 may be configured as or otherwise support a means for receiving, from a second UE of the group of UEs, a second capability message that indicates one or more second WUS waveform types and one or more second sets of WUS waveform parameters that are supported by the second UE, where determining the group of UEs is based on the one or more first sets of WUS waveform parameters and the one or more second sets of WUS waveform parameters including the set of WUS waveform parameters that are common to the UEs in the group.

In some examples, to support determining the group of UEs, the UE grouping component 1240 may be configured as or otherwise support a means for determining to include the UEs in the group based on downlink beams used for communications by the UEs.

In some examples, to support determining the group of UEs, the UE grouping component 1240 may be configured as or otherwise support a means for determining to include the UEs in the group based on link conditions associated with communications at the UEs.

In some examples, to support determining the group of the UEs, the UE grouping component 1240 may be configured as or otherwise support a means for determining to include the UEs in the group based on applications executed by the UEs.

Figure 13:
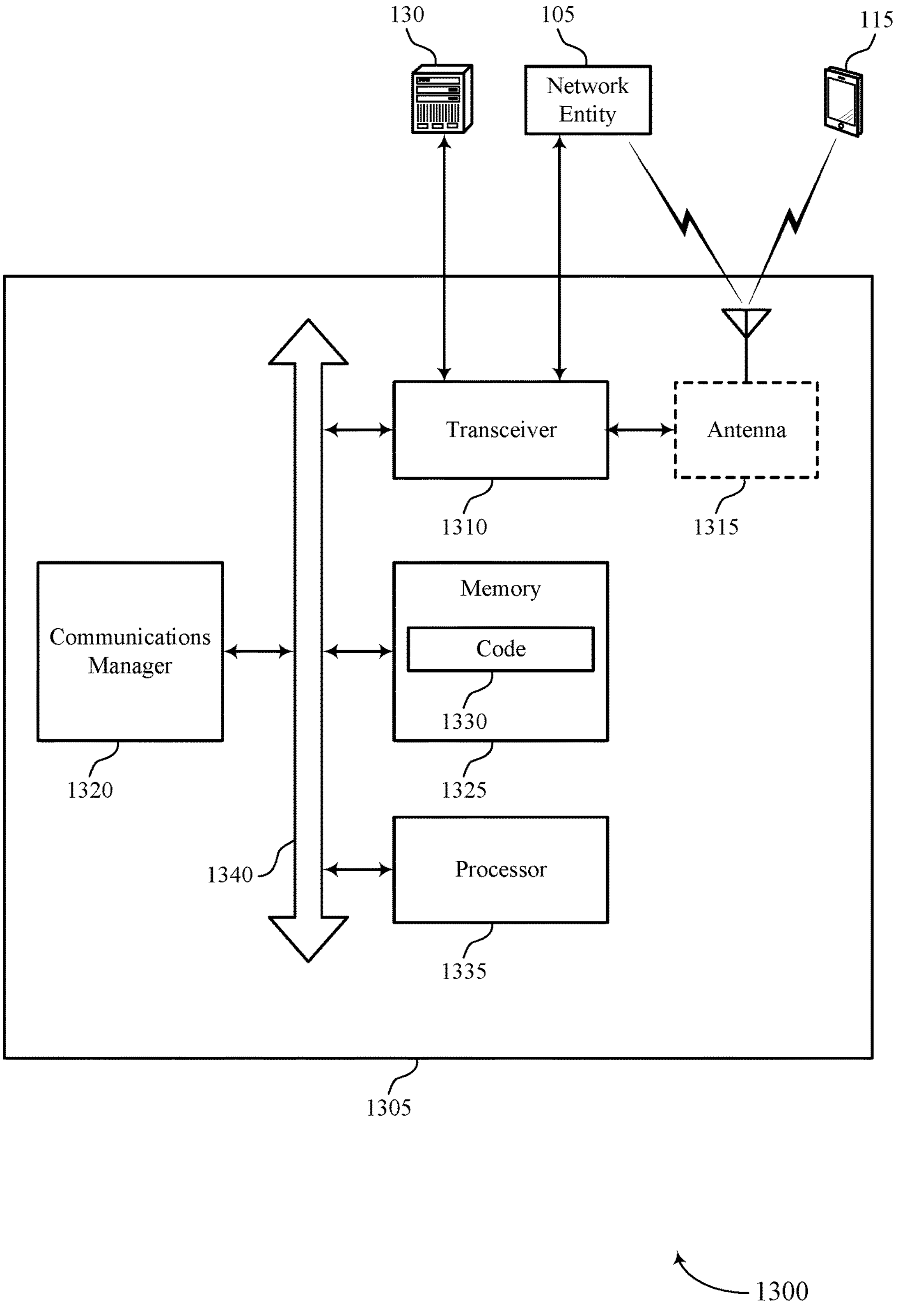
FIG. 13 illustrates a diagram of a system including a device that supports low power wake-up signaling capabilities in accordance with one or more aspects of the present disclosure.

FIG. 13 illustrates a diagram of a system 1300 including a device 1305 that supports low power wake-up signaling capabilities in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting low power wake-up signaling capabilities). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for receiving a capability message that indicates a respective set of one or more WUS parameters associated with one or more WUS waveform types that are supported by a UE in communication with the network entity. The communications manager 1320 may be configured as or otherwise support a means for transmitting an indication of a set of WUSs to be monitored by the UE while operating in a low power mode, the set of WUSs based on the respective set of one or more WUS parameters and the one or more WUS waveform types that are supported by the UE. The communications manager 1320 may be configured as or otherwise support a means for transmitting at least one WUS of the set of WUSs based on the indication.

Additionally, or alternatively, the communications manager 1320 may support wireless communications at a network entity in accordance with examples as disclosed herein. For example, the communications manager 1320 may be configured as or otherwise support a means for determining a group of UEs, where the UEs are included in the group based on a set of WUS waveform parameters being common to the UEs. The communications manager 1320 may be configured as or otherwise support a means for transmitting a group WUS based on determining the group of UEs, the group WUS including a request for each UE of the group of UEs to transition from a first mode of operation to a second mode of operation. The communications manager 1320 may be configured as or otherwise support a means for transmitting a communication to at least one UE of the group of UEs to activate a second transceiver of the UE, where a second transceiver power of the second transceiver is associated with higher power consumption than a first transceiver of the UE that is associated with the first mode of operation.

By including or configuring the communications manager 1320 in accordance with examples as described herein, the device 1305 may support techniques for low power wake-up signaling capabilities, which may provide for improved communication reliability, reduced latency, improved user experience related to reduced processing, reduced power consumption, more efficient utilization of communication resources, improved coordination between devices, longer battery life, or improved utilization of processing capability, among other advantages.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of low power wake-up signaling capabilities as described herein, or the processor 1335 and the memory 1325 may be otherwise configured to perform or support such operations.

Figure 14:
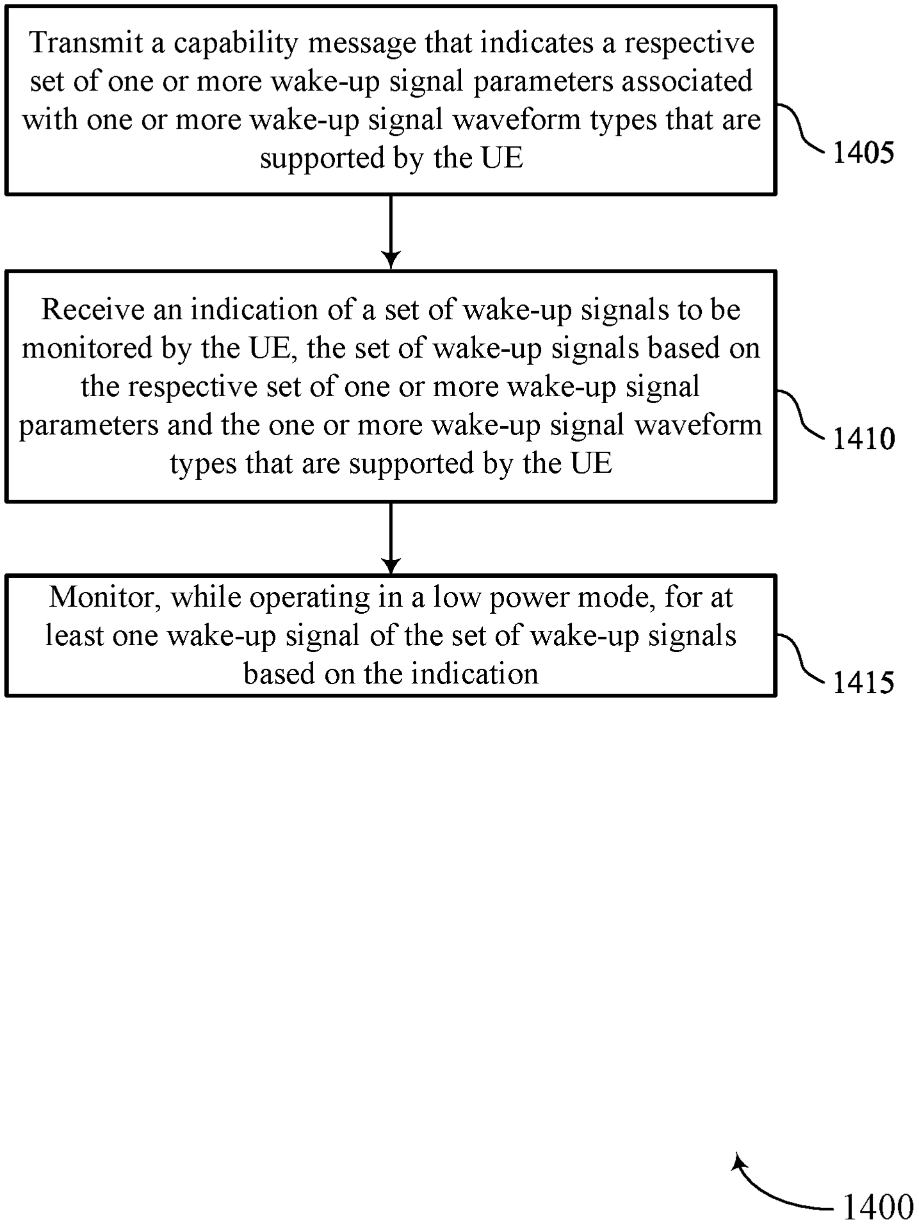
FIGS. 14 through 21 illustrate flowcharts showing methods that support low power wake-up signaling capabilities in accordance with one or more aspects of the present disclosure.

FIG. 14 illustrates a flowchart illustrating a method 1400 that supports low power wake-up signaling capabilities in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include transmitting a capability message that indicates a respective set of one or more WUS parameters associated with one or more WUS waveform types that are supported by the UE. The operations of 1405 may be performed in accordance with examples as disclosed herein. In some examples, aspects of the operations of 1405 may be performed by a capability message component 825 as described with reference to FIG. 8.

At 1410, the method may include receiving an indication of a set of WUSs to be monitored by the UE, the set of WUSs based on the respective set of one or more WUS parameters and the one or more WUS waveform types that are supported by the UE. The operations of 1410 may be performed in accordance with examples as disclosed herein. In some examples, aspects of the operations of 1410 may be performed by a WUS indication component 830 as described with reference to FIG. 8.

At 1415, the method may include monitoring, while operating in a low power mode, for at least one WUS of the set of WUSs based on the indication. The operations of 1415 may be performed in accordance with examples as disclosed herein. In some examples, aspects of the operations of 1415 may be performed by a WUS monitoring component 835 as described with reference to FIG. 8.

Figure 15:
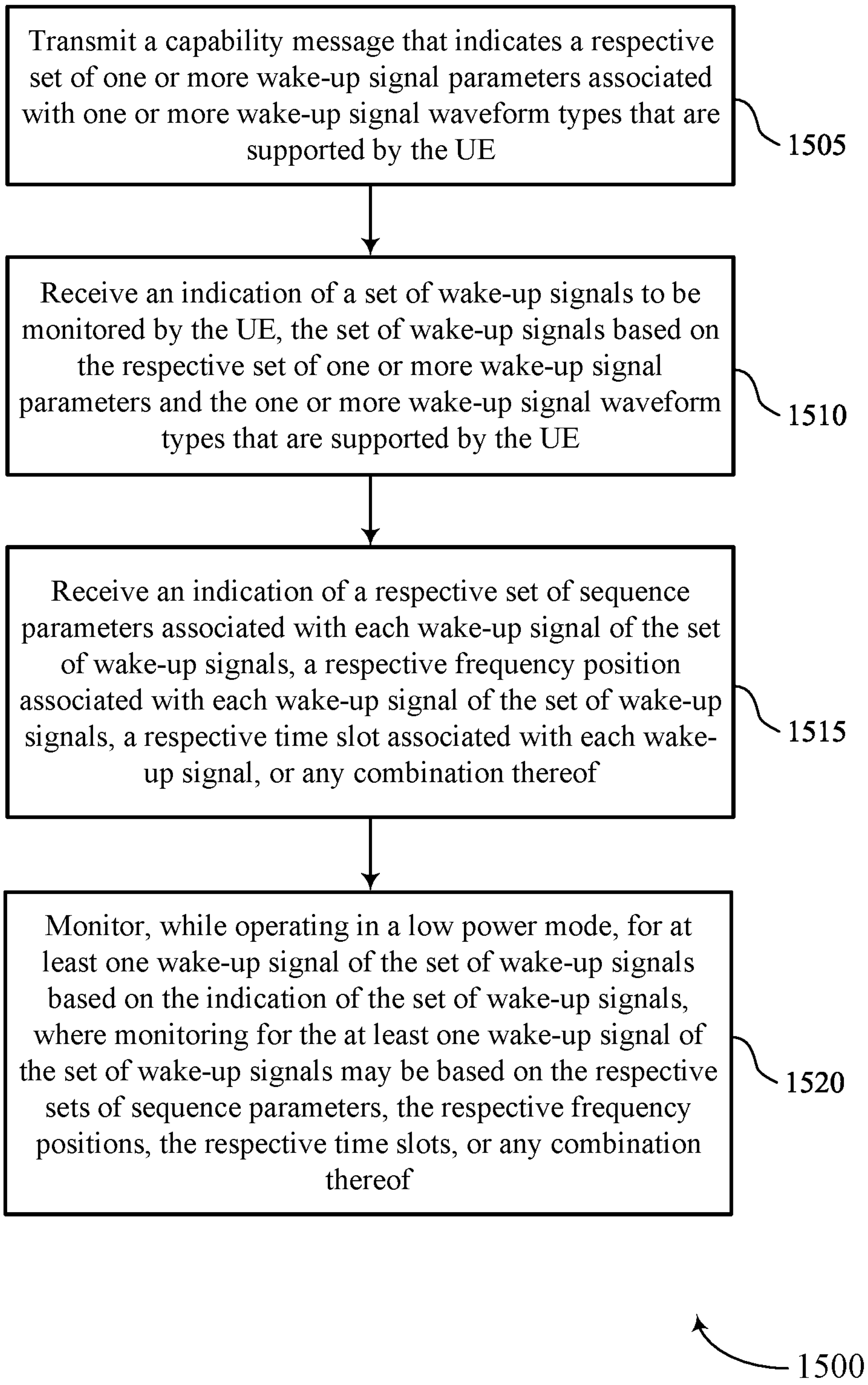

FIG. 15 illustrates a flowchart illustrating a method 1500 that supports low power wake-up signaling capabilities in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting a capability message that indicates a respective set of one or more WUS parameters associated with one or more WUS waveform types that are supported by the UE. The operations of 1505 may be performed in accordance with examples as disclosed herein. In some examples, aspects of the operations of 1505 may be performed by a capability message component 825 as described with reference to FIG. 8.

At 1510, the method may include receiving an indication of a set of WUSs to be monitored by the UE, the set of WUSs based on the respective set of one or more WUS parameters and the one or more WUS waveform types that are supported by the UE. The operations of 1510 may be performed in accordance with examples as disclosed herein. In some examples, aspects of the operations of 1510 may be performed by a WUS indication component 830 as described with reference to FIG. 8.

At 1515, the method may include receiving an indication of a respective set of sequence parameters associated with each WUS of the set of WUSs, a respective frequency position associated with each WUS of the set of WUSs, a respective time slot associated with each WUS, or any combination thereof. The operations of 1515 may be performed in accordance with examples as disclosed herein. In some examples, aspects of the operations of 1515 may be performed by a sequence parameter indication component 855 as described with reference to FIG. 8.

At 1520, the method may include monitoring, while operating in a low power mode, for at least one WUS of the set of WUSs based on the indication of the set of WUSs. In some examples, monitoring for the at least one WUS of the set of WUSs may be based on the respective sets of sequence parameters, the respective frequency positions, the respective time slots, or any combination thereof. The operations of 1520 may be performed in accordance with examples as disclosed herein. In some examples, aspects of the operations of 1520 may be performed by a WUS monitoring component 835 as described with reference to FIG. 8.

Figure 16:
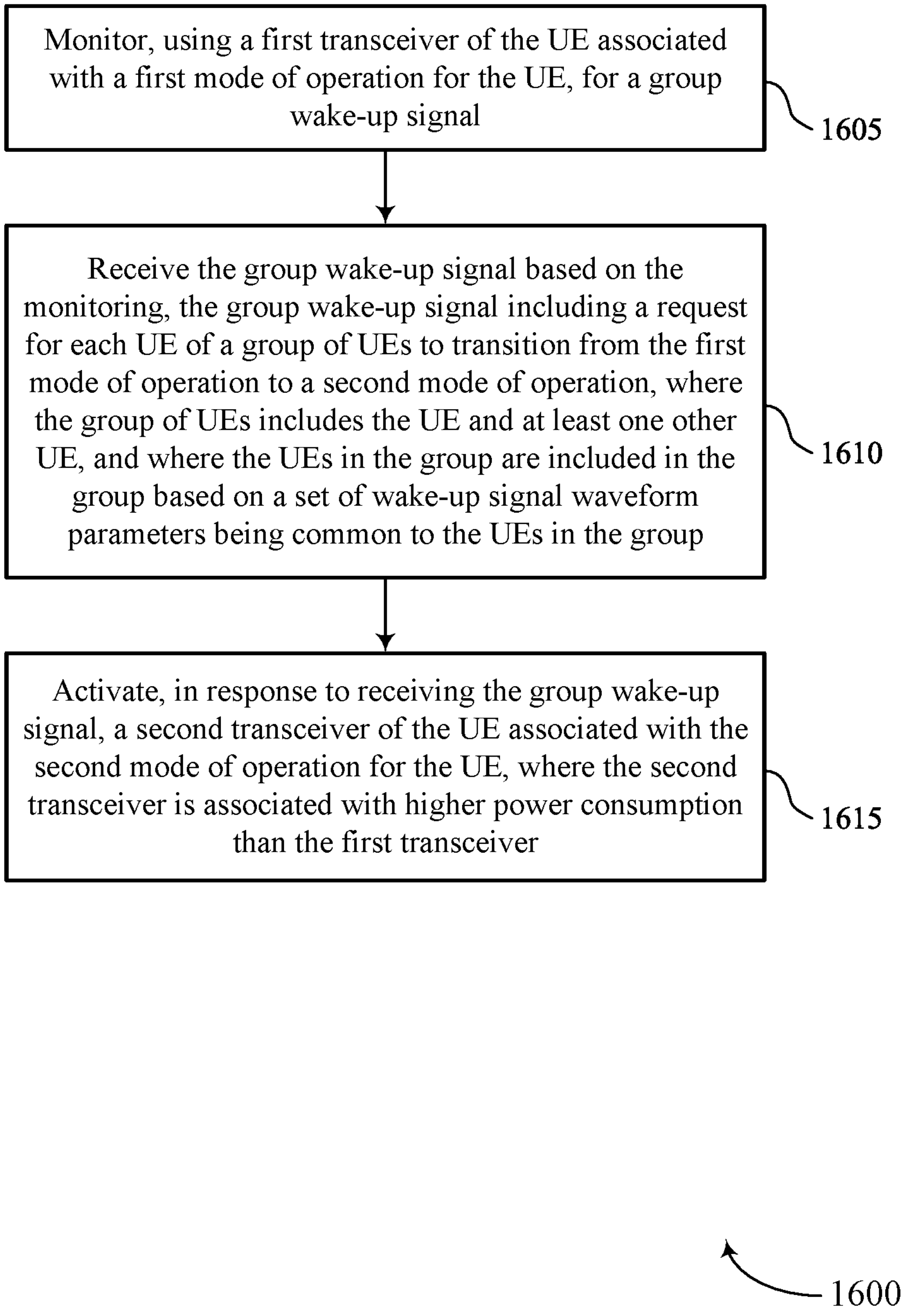

FIG. 16 illustrates a flowchart illustrating a method 1600 that supports low power wake-up signaling capabilities in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include monitoring, using a first transceiver of the UE associated with a first mode of operation for the UE, for a group WUS. The operations of 1605 may be performed in accordance with examples as disclosed herein. In some examples, aspects of the operations of 1605 may be performed by a group WUS monitoring component 840 as described with reference to FIG. 8.

At 1610, the method may include receiving the group WUS based on the monitoring, the group WUS including a request for each UE of a group of UEs to transition from the first mode of operation to a second mode of operation, where the group of UEs includes the UE and at least one other UE, and where the UEs in the group are included in the group based on a set of WUS waveform parameters being common to the UEs in the group. The operations of 1610 may be performed in accordance with examples as disclosed herein. In some examples, aspects of the operations of 1610 may be performed by a group WUS component 845 as described with reference to FIG. 8.

At 1615, the method may include activating, in response to receiving the group WUS, a second transceiver of the UE associated with the second mode of operation for the UE, where the second transceiver is associated with higher power consumption than the first transceiver. The operations of 1615 may be performed in accordance with examples as disclosed herein. In some examples, aspects of the operations of 1615 may be performed by a transceiver activation component 850 as described with reference to FIG. 8.

Figure 17:
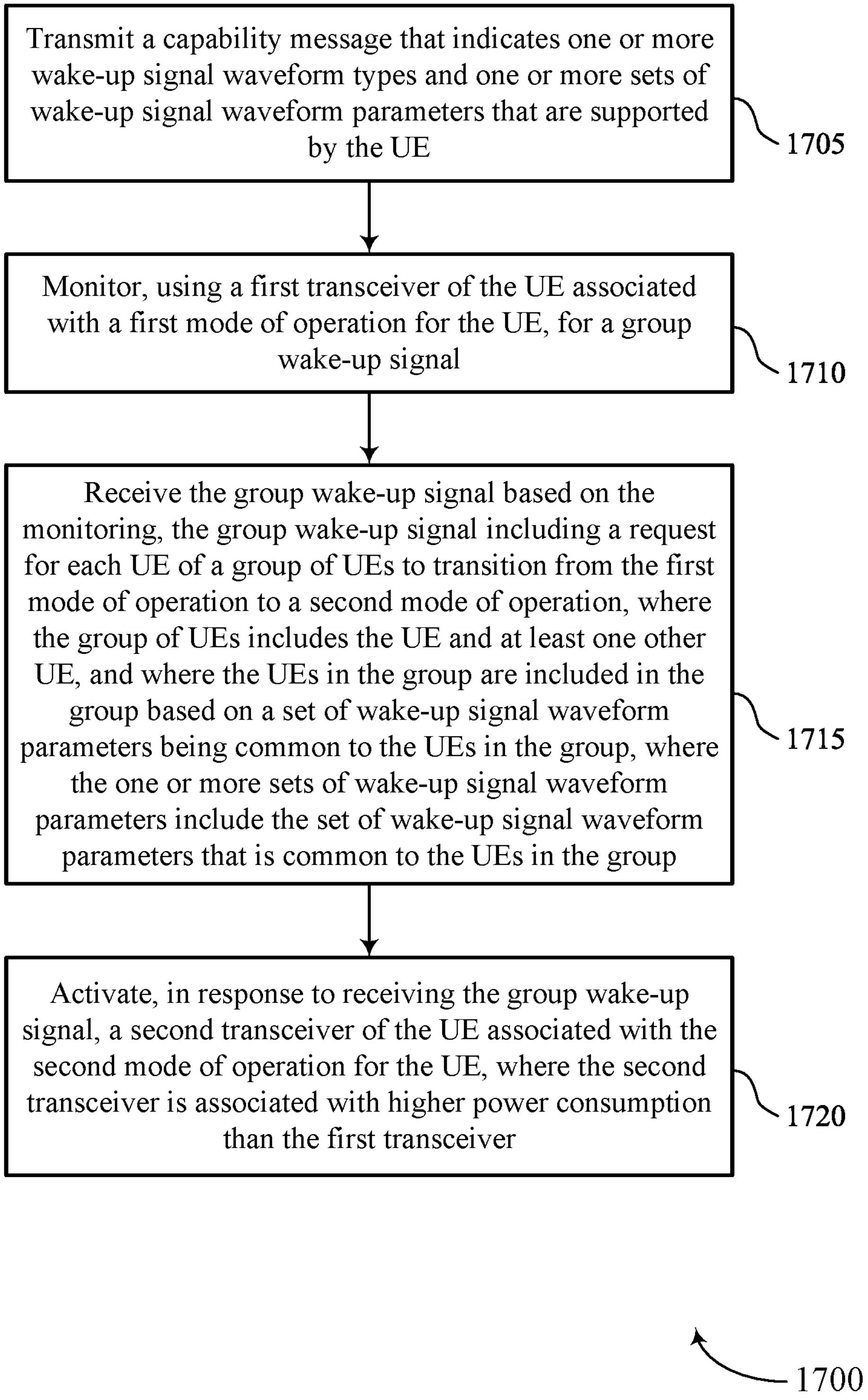

FIG. 17 illustrates a flowchart illustrating a method 1700 that supports low power wake-up signaling capabilities in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include transmitting a capability message that indicates one or more WUS waveform types and one or more sets of WUS waveform parameters that are supported by the UE. The operations of 1705 may be performed in accordance with examples as disclosed herein. In some examples, aspects of the operations of 1705 may be performed by a WUS waveform capability component 870 as described with reference to FIG. 8.

At 1710, the method may include monitoring, using a first transceiver of the UE associated with a first mode of operation for the UE, for a group WUS. The operations of 1710 may be performed in accordance with examples as disclosed herein. In some examples, aspects of the operations of 1710 may be performed by a group WUS monitoring component 840 as described with reference to FIG. 8.

At 1715, the method may include receiving the group WUS based on the monitoring, the group WUS including a request for each UE of a group of UEs to transition from the first mode of operation to a second mode of operation, where the group of UEs includes the UE and at least one other UE, and where the UEs in the group are included in the group based on a set of WUS waveform parameters being common to the UEs in the group, where the one or more sets of WUS waveform parameters include the set of WUS waveform parameters that is common to the UEs in the group. The operations of 1715 may be performed in accordance with examples as disclosed herein. In some examples, aspects of the operations of 1715 may be performed by a group WUS component 845 as described with reference to FIG. 8.

At 1720, the method may include activating, in response to receiving the group WUS, a second transceiver of the UE associated with the second mode of operation for the UE, where the second transceiver is associated with higher power consumption than the first transceiver. The operations of 1720 may be performed in accordance with examples as disclosed herein. In some examples, aspects of the operations of 1720 may be performed by a transceiver activation component 850 as described with reference to FIG. 8.

Figure 18:
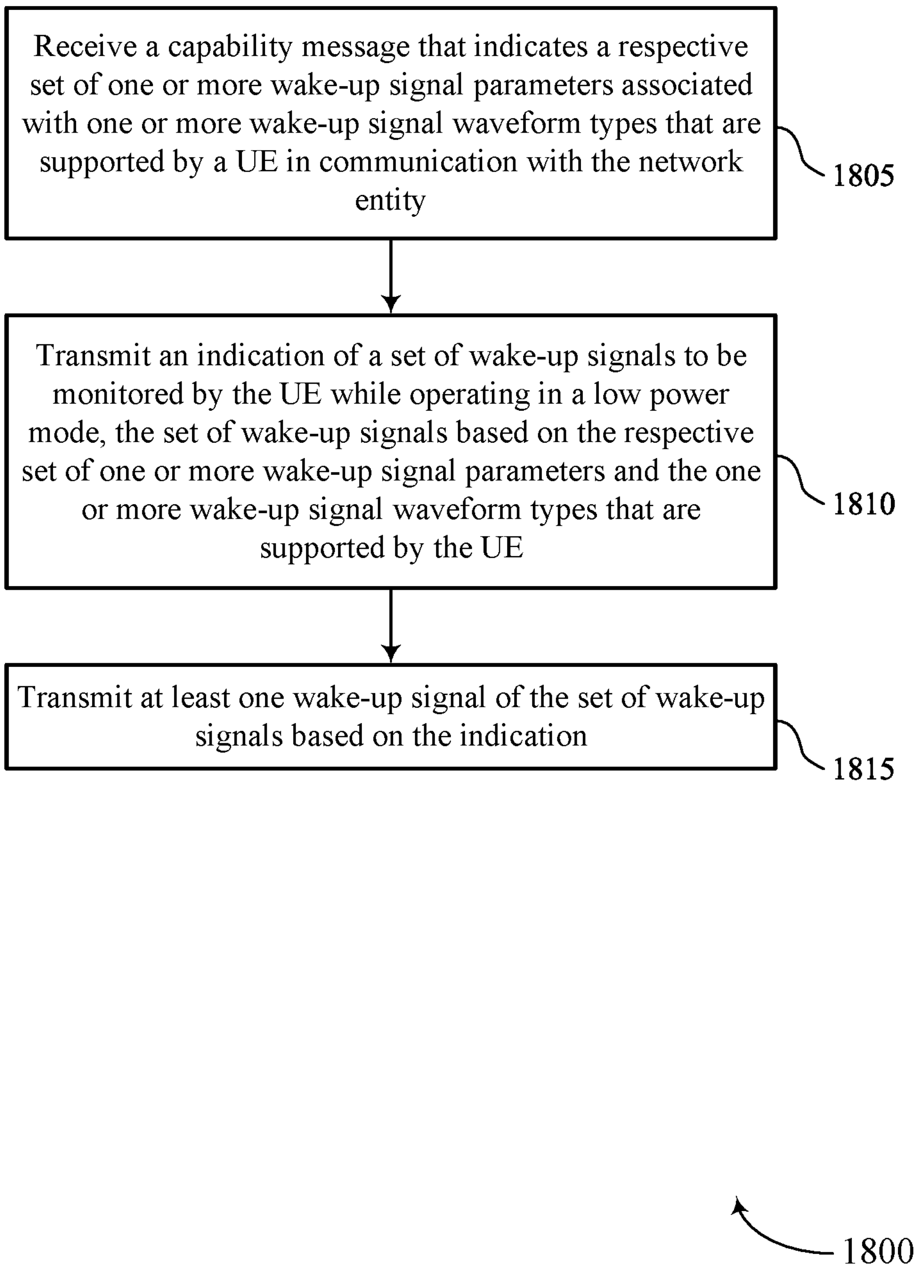

FIG. 18 illustrates a flowchart illustrating a method 1800 that supports low power wake-up signaling capabilities in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include receiving a capability message that indicates a respective set of one or more WUS parameters associated with one or more WUS waveform types that are supported by a UE in communication with the network entity. The operations of 1805 may be performed in accordance with examples as disclosed herein. In some examples, aspects of the operations of 1805 may be performed by a capability message component 1225 as described with reference to FIG. 12.

At 1810, the method may include transmitting an indication of a set of WUSs to be monitored by the UE while operating in a low power mode, the set of WUSs based on the respective set of one or more WUS parameters and the one or more WUS waveform types that are supported by the UE. The operations of 1810 may be performed in accordance with examples as disclosed herein. In some examples, aspects of the operations of 1810 may be performed by a WUS indication component 1230 as described with reference to FIG. 12.

At 1815, the method may include transmitting at least one WUS of the set of WUSs based on the indication. The operations of 1815 may be performed in accordance with examples as disclosed herein. In some examples, aspects of the operations of 1815 may be performed by a WUS component 1235 as described with reference to FIG. 12.

Figure 19:
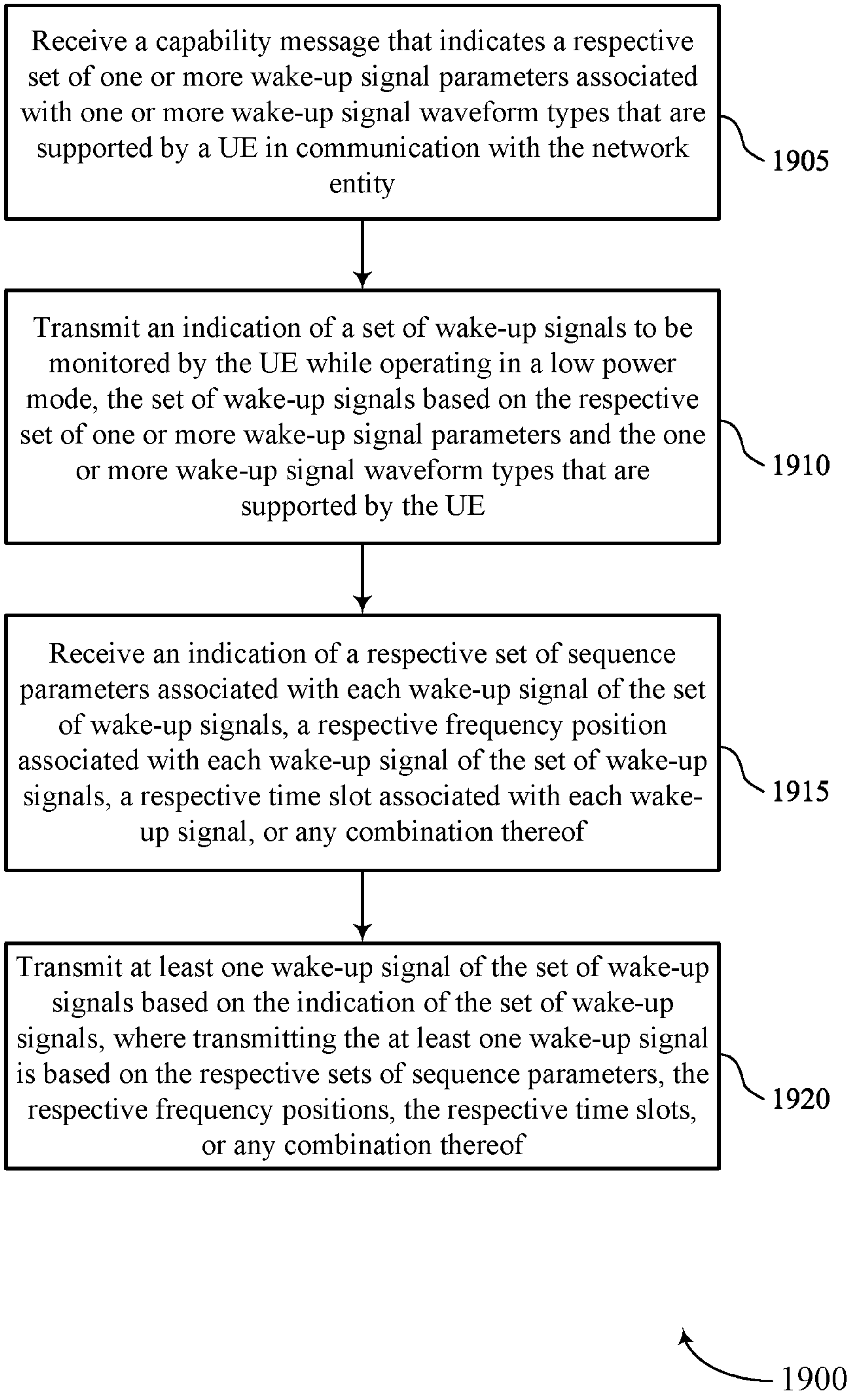

FIG. 19 illustrates a flowchart illustrating a method 1900 that supports low power wake-up signaling capabilities in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include receiving a capability message that indicates a respective set of one or more WUS parameters associated with one or more WUS waveform types that are supported by a UE in communication with the network entity. The operations of 1905 may be performed in accordance with examples as disclosed herein. In some examples, aspects of the operations of 1905 may be performed by a capability message component 1225 as described with reference to FIG. 12.

At 1910, the method may include transmitting an indication of a set of WUSs to be monitored by the UE while operating in a low power mode, the set of WUSs based on the respective set of one or more WUS parameters and the one or more WUS waveform types that are supported by the UE. The operations of 1910 may be performed in accordance with examples as disclosed herein. In some examples, aspects of the operations of 1910 may be performed by a WUS indication component 1230 as described with reference to FIG. 12.

At 1915, the method may include receiving an indication of a respective set of sequence parameters associated with each WUS of the set of WUSs, a respective frequency position associated with each WUS of the set of WUSs, a respective time slot associated with each WUS, or any combination thereof. The operations of 1915 may be performed in accordance with examples as disclosed herein. In some examples, aspects of the operations of 1915 may be performed by a sequence parameter indication component 1255 as described with reference to FIG. 12.

At 1920, the method may include transmitting at least one WUS of the set of WUSs based on the indication of the set of WUSs, where transmitting the at least one WUS is based on the respective sets of sequence parameters, the respective frequency positions, the respective time slots, or any combination thereof. The operations of 1920 may be performed in accordance with examples as disclosed herein. In some examples, aspects of the operations of 1920 may be performed by a WUS component 1235 as described with reference to FIG. 12.

Figure 20:
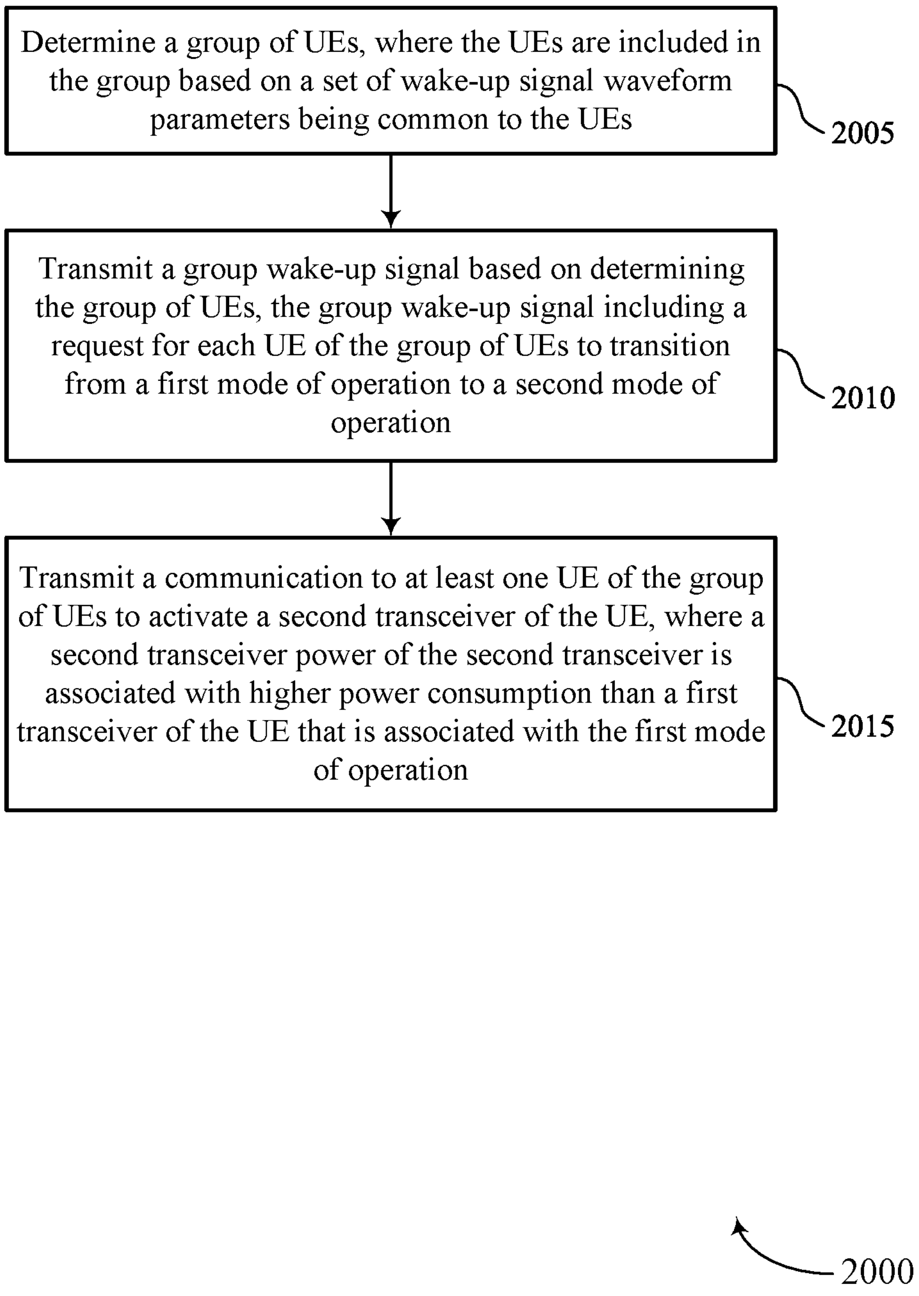

FIG. 20 illustrates a flowchart illustrating a method 2000 that supports low power wake-up signaling capabilities in accordance with one or more aspects of the present disclosure. The operations of the method 2000 may be implemented by a network entity or its components as described herein. For example, the operations of the method 2000 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2005, the method may include determining a group of UEs, where the UEs are included in the group based on a set of WUS waveform parameters being common to the UEs. The operations of 2005 may be performed in accordance with examples as disclosed herein. In some examples, aspects of the operations of 2005 may be performed by a UE grouping component 1240 as described with reference to FIG. 12.

At 2010, the method may include transmitting a group WUS based on determining the group of UEs, the group WUS including a request for each UE of the group of UEs to transition from a first mode of operation to a second mode of operation. The operations of 2010 may be performed in accordance with examples as disclosed herein. In some examples, aspects of the operations of 2010 may be performed by a group WUS component 1245 as described with reference to FIG. 12.

At 2015, the method may include transmitting a communication to at least one UE of the group of UEs to activate a second transceiver of the UE, where a second transceiver power of the second transceiver is associated with higher power consumption than a first transceiver of the UE that is associated with the first mode of operation. The operations of 2015 may be performed in accordance with examples as disclosed herein. In some examples, aspects of the operations of 2015 may be performed by a communication component 1250 as described with reference to FIG. 12.

Figure 21:
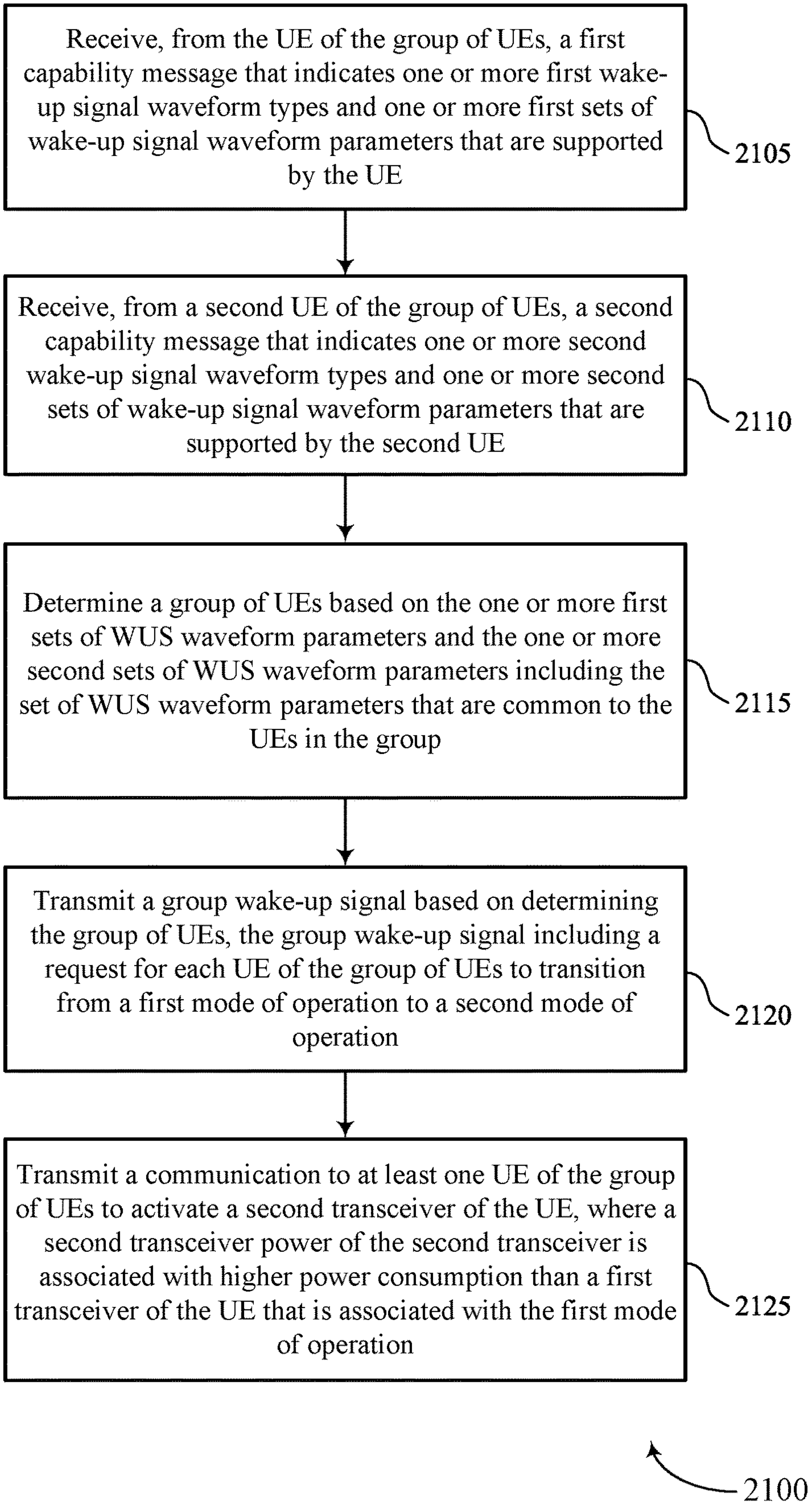

FIG. 21 illustrates a flowchart illustrating a method 2100 that supports low power wake-up signaling capabilities in accordance with one or more aspects of the present disclosure. The operations of the method 2100 may be implemented by a network entity or its components as described herein. For example, the operations of the method 2100 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2105, the method may include receiving, from the UE of the group of UEs, a first capability message that indicates one or more first WUS waveform types and one or more first sets of WUS waveform parameters that are supported by the UE. The operations of 2105 may be performed in accordance with examples as disclosed herein. In some examples, aspects of the operations of 2105 may be performed by a capability message component 1225 as described with reference to FIG. 12.

At 2110, the method may include receiving, from a second UE of the group of UEs, a second capability message that indicates one or more second WUS waveform types and one or more second sets of WUS waveform parameters that are supported by the second UE, The operations of 2110 may be performed in accordance with examples as disclosed herein. In some examples, aspects of the operations of 2110 may be performed by a capability message component 1225 as described with reference to FIG. 12.

At 2115, the method may include determining a group of UEs based on the one or more first sets of WUS waveform parameters and the one or more second sets of WUS waveform parameters including the set of WUS waveform parameters that are common to the UEs in the group. The operations of 2115 may be performed in accordance with examples as disclosed herein. In some examples, aspects of the operations of 2115 may be performed by a UE grouping component 1240 as described with reference to FIG. 12.

At 2120, the method may include transmitting a group WUS based on determining the group of UEs, the group WUS including a request for each UE of the group of UEs to transition from a first mode of operation to a second mode of operation. The operations of 2120 may be performed in accordance with examples as disclosed herein. In some examples, aspects of the operations of 2120 may be performed by a group WUS component 1245 as described with reference to FIG. 12.

At 2125, the method may include transmitting a communication to at least one UE of the group of UEs to activate a second transceiver of the UE, where a second transceiver power of the second transceiver is associated with higher power consumption than a first transceiver of the UE that is associated with the first mode of operation. The operations of 2125 may be performed in accordance with examples as disclosed herein. In some examples, aspects of the operations of 2125 may be performed by a communication component 1250 as described with reference to FIG. 12. The following provides an overview of aspects of the present disclosure:

Aspect 1: A method for wireless communications at a UE, comprising: transmitting a capability message that indicates a respective set of one or more WUS parameters associated with one or more WUS waveform types that are supported by the UE; receiving an indication of a set of WUSs to be monitored by the UE, the set of WUSs based at least in part on the respective set of one or more WUS parameters and the one or more WUS waveform types that are supported by the UE; and monitoring, while operating in a low power mode, for at least one WUS of the set of WUSs based at least in part on the indication.

Aspect 2: The method of aspect 1, further comprising: receiving an indication of a respective set of sequence parameters associated with each WUS of the set of WUSs, a respective frequency position associated with each WUS of the set of WUSs, a time slot associated with each WUS, or any combination thereof, wherein monitoring for the at least one WUS of the set of WUSs is based at least in part on the respective sets of sequence parameters, or the respective frequency positions, or both.

Aspect 3: The method of any of aspects 1 through 2, wherein transmitting the capability message comprises: transmitting an indication of a respective sequence length supported by the UE for each WUS waveform type of the one or more WUS waveform types that are supported by the UE, wherein the respective sequence lengths each comprise a respective quantity of time-domain symbols included in a respective WUS waveform type.

Aspect 4: The method of any of aspects 1 through 3, wherein transmitting the capability message comprises: transmitting an indication of a quantity of waveform sequences that the UE is capable of concurrently receiving within overlapping frequency resources, wherein each waveform sequence of the quantity corresponds to a respective sequence of one or more bit values.

Aspect 5: The method of any of aspects 1 through 4, wherein transmitting the capability message comprises: transmitting an indication of a quantity of frequency domain allocation positions that the UE is capable of concurrently monitoring for a WUS waveform.

Aspect 6: The method of any of aspects 1 through 5, wherein transmitting the capability message comprises: transmitting an indication of a respective quantity of time domain hypotheses supported by the UE for each WUS waveform type of the one or more WUS waveform types that are supported by the UE, wherein the respective quantities of time domain hypotheses each correspond to a respective quantity of time positions that the UE is capable of monitoring for a WUS waveform of a corresponding WUS waveform type.

Aspect 7: The method of any of aspects 1 through 6, wherein the UE is included in one or more groups of UEs, each group of the one or more groups comprising the UE and at least one other UE based at least in part on the at least one other UE also supporting at least some of the respective sets of one or more WUS parameters and the one or more WUS waveform types that are supported by the UE; and the set of WUSs comprises a respective group WUS for each of the one or more groups of UEs.

Aspect 8: The method of any of aspects 1 through 7, further comprising: receiving a WUS from the set of WUSs based at least in part on the monitoring; and transitioning from the low power mode to a second power mode in response to receiving the WUS.

Aspect 9: The method of any of aspects 1 through 8, wherein the one or more WUS waveform types comprise one or more OFDM waveform types, one or more OOK waveform types, or any combination thereof.

Aspect 10: A method for wireless communications at a UE, comprising: monitoring, using a first transceiver of the UE associated with a first mode of operation for the UE, for a group WUS; receiving the group WUS based at least in part on the monitoring, the group WUS comprising a request for each UE of a group of UEs to transition from the first mode of operation to a second mode of operation, wherein the group of UEs comprises the UE and at least one other UE, and wherein the UEs in the group are included in the group based at least in part on a set of WUS waveform parameters being common to the UEs in the group; and activating, in response to receiving the group WUS, a second transceiver of the UE associated with the second mode of operation for the UE, wherein the second transceiver is associated with higher power consumption than the first transceiver.

Aspect 11: The method of aspect 10, further comprising: transmitting a capability message that indicates one or more WUS waveform types and one or more sets of WUS waveform parameters that are supported by the UE, the one or more sets of WUS waveform parameters comprising the set of WUS waveform parameters that is common to the UEs in the group.

Aspect 12: The method of any of aspects 10 through 11, wherein the UEs in the group are included in the group based at least in part on downlink beams used for communications by the UEs, link conditions associated with communications at the UEs, applications executed by the UEs, or any combination thereof.

Aspect 13: The method of any of aspects 10 through 11, wherein the UE is included in the group of UEs and one or more second groups of UEs based at least in part on one or more sets of WUS waveform parameters that are supported by the UE.

Aspect 14: A method for wireless communications at a network entity, comprising: receiving a capability message that indicates a respective set of one or more WUS parameters associated with one or more WUS waveform types that are supported by a UE in communication with the network entity; transmitting an indication of a set of WUSs to be monitored by the UE while operating in a low power mode, the set of WUSs based at least in part on the respective set of one or more WUS parameters and the one or more WUS waveform types that are supported by the UE; and transmitting at least one WUS of the set of WUSs based at least in part on the indication.

Aspect 15: The method of aspect 14, further comprising: receiving an indication of a respective set of sequence parameters associated with each WUS of the set of WUSs, a respective frequency position associated with each WUS of the set of WUSs, a time slot associated with each WUS, or any combination thereof, wherein transmitting the at least one WUS is based at least in part on the respective sets of sequence parameters, or the respective frequency positions, or both.

Aspect 16: The method of any of aspects 14 through 15, wherein receiving the capability message comprises: receiving an indication of a respective sequence length supported by the UE for each WUS waveform type of the one or more WUS waveform types that are supported by the UE, wherein the respective sequence lengths each comprise a respective quantity of time-domain symbols included in a respective WUS waveform type.

Aspect 17: The method of any of aspects 14 through 16, wherein receiving the capability message comprises: receiving an indication of a quantity of waveform sequences that the UE is capable of concurrently receiving within overlapping frequency resources, wherein each waveform sequence of the quantity corresponds to a respective sequence of one or more bits.

Aspect 18: The method of any of aspects 14 through 17, wherein receiving the capability message comprises: receiving an indication of a quantity of frequency domain allocation positions that the UE is capable of concurrently monitoring for a WUS waveform.

Aspect 19: The method of any of aspects 14 through 18, wherein receiving the capability message comprises: receiving an indication of a respective quantity of time domain hypotheses supported by the UE for each WUS waveform type of the one or more WUS waveform types that are supported by the UE, wherein the respective quantities of time domain hypotheses each correspond to a respective quantity of time positions that the UE is capable of monitoring for a WUS waveform of a corresponding WUS waveform type.

Aspect 20: The method of any of aspects 14 through 19, further comprising: receiving a second capability message from a second UE that indicates a second respective set of one or more WUS parameters associated with one or more second WUS waveform types that are supported by the second UE; and determining a group of UEs comprising the UE and the second UE based at least in part on the respective set of one or more WUS parameters and the one or more WUS waveform types that are supported by the UE at least partially overlapping with the second respective set of one or more WUS parameters and the one or more second WUS waveform types that are supported by the second UE, wherein the set of WUSs comprises a respective group WUS for the group of UEs.

Aspect 21: The method of any of aspects 14 through 20, further comprising: determining the set of WUSs based at least in part on the respective set of one or more WUS parameters and the one or more WUS waveform types that are supported by the UE.

Aspect 22: The method of any of aspects 14 through 21, wherein the one or more WUS waveform types comprise one or more OFDM waveform types, one or more OOK waveform types, or any combination thereof.

Aspect 23: A method for wireless communications at a network entity, comprising: determining a group of UEs, wherein the UEs are included in the group based at least in part on a set of WUS waveform parameters being common to the UEs; transmitting a group WUS based at least in part on determining the group of UEs, the group WUS comprising a request for each UE of the group of UEs to transition from a first mode of operation to a second mode of operation; and transmitting a communication to at least one UE of the group of UEs to activate a second transceiver of the UE, wherein a second transceiver power of the second transceiver is associated with higher power consumption than a first transceiver of the UE that is associated with the first mode of operation.

Aspect 24: The method of aspect 23, further comprising: receiving, from the UE of the group of UEs, a first capability message that indicates one or more first WUS waveform types and one or more first sets of WUS waveform parameters that are supported by the UE; and receiving, from a second UE of the group of UEs, a second capability message that indicates one or more second WUS waveform types and one or more second sets of WUS waveform parameters that are supported by the second UE, wherein determining the group of UEs is based at least in part on the one or more first sets of WUS waveform parameters and the one or more second sets of WUS waveform parameters comprising the set of WUS waveform parameters that are common to the UEs in the group.

Aspect 25: The method of any of aspects 23 through 24, wherein determining the group of UEs comprises: determining to include the UEs in the group based at least in part on downlink beams used for communications by the UEs.

Aspect 26: The method of any of aspects 23 through 25, wherein determining the group of UEs comprises: determining to include the UEs in the group based at least in part on link conditions associated with communications at the UEs.

Aspect 27: The method of any of aspects 23 through 26, wherein determining the group of the UEs comprises: determining to include the UEs in the group based at least in part on applications executed by the UEs.

Aspect 28: An apparatus for wireless communications at a UE, comprising a processor; memory coupled with the processor; and instructions stored in the memory and executable by the processor to cause the apparatus to perform a method of any of aspects 1 through 9.

Aspect 29: An apparatus for wireless communications at a UE, comprising at least one means for performing a method of any of aspects 1 through 9.

Aspect 30: A non-transitory computer-readable medium storing code for wireless communications at a UE, the code comprising instructions executable by a processor to perform a method of any of aspects 1 through 9.

Aspect 31: An apparatus for wireless communications at a UE, comprising a processor; memory coupled with the processor; and instructions stored in the memory and executable by the processor to cause the apparatus to perform a method of any of aspects 10 through 13.

Aspect 32: An apparatus for wireless communications at a UE, comprising at least one means for performing a method of any of aspects 10 through 13.

Aspect 33: A non-transitory computer-readable medium storing code for wireless communications at a UE, the code comprising instructions executable by a processor to perform a method of any of aspects 10 through 13.

Aspect 34: An apparatus for wireless communications at a network entity, comprising a processor; memory coupled with the processor; and instructions stored in the memory and executable by the processor to cause the apparatus to perform a method of any of aspects 14 through 22.

Aspect 35: An apparatus for wireless communications at a network entity, comprising at least one means for performing a method of any of aspects 14 through 22.

Aspect 36: A non-transitory computer-readable medium storing code for wireless communications at a network entity, the code comprising instructions executable by a processor to perform a method of any of aspects 14 through 22.

Aspect 37: An apparatus for wireless communications at a network entity, comprising a processor; memory coupled with the processor; and instructions stored in the memory and executable by the processor to cause the apparatus to perform a method of any of aspects 23 through 27.

Aspect 38: An apparatus for wireless communications at a network entity, comprising at least one means for performing a method of any of aspects 23 through 27.

Aspect 39: A non-transitory computer-readable medium storing code for wireless communications at a network entity, the code comprising instructions executable by a processor to perform a method of any of aspects 23 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions. Also as used here, the phrase "a set" shall be construed as including the possibility of a set with one member. That is, the phrase "a set" shall be construed in the same manner as "one or more."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

one or more processors;

one or more memories coupled with the one or more processors; and instructions stored in the one or more memories and executable by the one or more processors to cause the apparatus to:

transmit a capability message that indicates a respective set of one or more wake-up signal parameters associated with each of one or more wake-up signal waveform types that are supported by the UE, wherein each respective set of one or more wake-up signal parameters comprises at least one of a respective sequence length of the associated wake-up signal waveform type, a quantity of waveform sequences that the UE is capable of concurrently receiving within overlapping frequency resources, a quantity of frequency domain allocation positions that the UE is capable of concurrently monitoring for a wake-up signal waveform, a respective quantity of time domain hypotheses supported by the UE for each wake-up signal waveform type, or any combination thereof;

receive an indication of a set of wake-up signals to be monitored by the UE, the set of wake-up signals based at least in part on the respective set of one or more wake-up signal parameters and the one or more wake-up signal waveform types that are supported by the UE; and monitor, while operating in a low power mode, for at least one wake-up signal of the set of wake-up signals based at least in part on the indication.

2. The apparatus of claim 1, wherein the instructions are further executable by the one or more processors to cause the apparatus to:

receive an indication of a respective set of sequence parameters associated with each wake-up signal of the set of wake-up signals, a respective frequency position associated with each wake-up signal of the set of wake-up signals, a respective time slot associated with each wake-up signal, or any combination thereof, wherein the instructions are executable by the one or more processors to cause the apparatus to monitor for the at least one wake-up signal of the set of wake-up signals based at least in part on the respective sets of sequence parameters, the respective frequency positions, or the respective time slots, or any combination thereof.

3. The apparatus of claim 1, wherein the respective sequence lengths each comprise a respective quantity of time-domain symbols included in a respective wake-up signal waveform type.

4. The apparatus of claim 1, wherein each waveform sequence of the quantity corresponds to a respective sequence of one or more bit values.

5. The apparatus of claim 1, wherein the respective quantities of time domain hypotheses each correspond to a respective quantity of time positions that the UE is capable of monitoring for a wake-up signal waveform of a corresponding wake-up signal waveform type.

6. The apparatus of claim 1, wherein the UE is included in one or more groups of UEs, each group of the one or more groups comprising the UE and at least one other UE based at least in part on the at least one other UE also supporting at least some of the respective sets of one or more wake-up signal parameters and the one or more wake-up signal waveform types that are supported by the UE.

7. The apparatus of claim 6, wherein the set of wake-up signals comprises a respective group wake-up signal for each of the one or more groups of UEs.

8. The apparatus of claim 1, wherein the instructions are further executable by the one or more processors to cause the apparatus to:

receive a wake-up signal from the set of wake-up signals based at least in part on the monitoring; and transition from the low power mode to a second power mode in response to receiving the wake-up signal.

9. The apparatus of claim 1, wherein the one or more wake-up signal waveform types comprise one or more orthogonal frequency division multiplexing waveform types, one or more on-off keying waveform types, or any combination thereof.

10. An apparatus for wireless communications at a network entity, comprising:

one or more processors;

one or more memories coupled with the one or more processors; and instructions stored in the one or more memories and executable by the one or more processors to cause the apparatus to:

receive a capability message that indicates a respective set of one or more wake-up signal parameters associated with each of one or more wake-up signal waveform types that are supported by a user equipment (UE) in communication with the network entity, wherein each respective set of one or more wake-up signal parameters comprises at least one of a respective sequence length of the associated wake-up signal waveform type, a quantity of waveform sequences that the UE is capable of concurrently receiving within overlapping frequency resources, a quantity of frequency domain allocation positions that the UE is capable of concurrently monitoring for a wake-up signal waveform, a respective quantity of time domain hypotheses supported by the UE for each wake-up signal waveform type, or any combination thereof;

transmit an indication of a set of wake-up signals to be monitored by the UE while operating in a low power mode, the set of wake-up signals based at least in part on the respective set of one or more wake-up signal parameters and the one or more wake-up signal waveform types that are supported by the UE; and transmit at least one wake-up signal of the set of wake-up signals based at least in part on the indication.

11. The apparatus of claim 10, wherein the instructions are further executable by the one or more processors to cause the apparatus to:

transmit an indication of a respective set of sequence parameters associated with each wake-up signal of the set of wake-up signals, a respective frequency position associated with each wake-up signal of the set of wake-up signals, a respective time slot associated with each wake-up signal, or any combination thereof, wherein the instructions are executable by the one or more processors to cause the apparatus to transmit the at least one wake-up signal is based at least in part on the respective sets of sequence parameters, the respective frequency positions, the respective time slots, or any combination thereof.

12. The apparatus of claim 10, wherein the respective sequence lengths each comprise a respective quantity of time-domain symbols included in a respective wake-up signal waveform type.

13. The apparatus of claim 10, wherein each waveform sequence of the quantity corresponds to a respective sequence of one or more values.

14. The apparatus of claim 10, wherein the respective quantities of time domain hypotheses each correspond to a respective quantity of time positions that the UE is capable of monitoring for a wake-up signal waveform of a corresponding wake-up signal waveform type.

15. The apparatus of claim 10, wherein the instructions are further executable by the one or more processors to cause the apparatus to:

receive a second capability message from a second UE that indicates a second respective set of one or more wake-up signal parameters associated with one or more second wake-up signal waveform types that are supported by the second UE; and determine a group of UEs comprising the UE and the second UE based at least in part on the respective set of one or more wake-up signal parameters and the one or more wake-up signal waveform types that are supported by the UE at least partially overlapping with the second respective set of one or more wake-up signal parameters and the one or more second wake-up signal waveform types that are supported by the second UE, wherein the set of wake-up signals comprises a respective group wake-up signal for the group of UEs.

16. The apparatus of claim 10, wherein the instructions are further executable by the one or more processors to cause the apparatus to:

determine the set of wake-up signals based at least in part on the respective set of one or more wake-up signal parameters and the one or more wake-up signal waveform types that are supported by the UE.

17. The apparatus of claim 10, wherein the one or more wake-up signal waveform types comprise one or more orthogonal frequency division multiplexing waveform types, one or more on-off keying waveform types, or any combination thereof.

18. A method for wireless communications at a user equipment (UE), comprising:

transmitting a capability message that indicates a respective set of one or more wake-up signal parameters associated with each of one or more wake-up signal waveform types that are supported by the UE, wherein each respective set of one or more wake-up signal parameters comprises at least one of a respective sequence length of the associated wake-up signal waveform type, a quantity of waveform sequences that the UE is capable of concurrently receiving within overlapping frequency resources, a quantity of frequency domain allocation positions that the UE is capable of concurrently monitoring for a wake-up signal waveform, a respective quantity of time domain hypotheses supported by the UE for each wake-up signal waveform type, or any combination thereof;

receiving an indication of a set of wake-up signals to be monitored by the UE, the set of wake-up signals based at least in part on the respective set of one or more wake-up signal parameters and the one or more wake-up signal waveform types that are supported by the UE; and monitoring, while operating in a low power mode, for at least one wake-up signal of the set of wake-up signals based at least in part on the indication.

19. The method of claim 18, further comprising:

receiving an indication of a respective set of sequence parameters associated with each wake-up signal of the set of wake-up signals, a respective frequency position associated with each wake-up signal of the set of wake-up signals, a respective time slot associated with each wake-up signal, or any combination thereof, wherein monitoring for the at least one wake-up signal is further based at least in part on the respective sets of sequence parameters, the respective frequency positions, or the respective time slots, or any combination thereof.

20. The method of claim 18, wherein the respective sequence lengths each comprise a respective quantity of time-domain symbols included in a respective wake-up signal waveform type.

21. The method of claim 18, wherein each waveform sequence of the quantity corresponds to a respective sequence of one or more bit values.

22. The method of claim 18, wherein the respective quantities of time domain hypotheses each correspond to a respective quantity of time positions that the UE is capable of monitoring for a wake-up signal waveform of a corresponding wake-up signal waveform type.

23. A method for wireless communications at a network entity, comprising:

receiving a capability message that indicates a respective set of one or more wake-up signal parameters associated with each of one or more wake-up signal waveform types that are supported by a user equipment (UE) in communication with the network entity, wherein each respective set of one or more wake-up signal parameters comprises at least one of a respective sequence length of the associated wake-up signal waveform type, a quantity of waveform sequences that the UE is capable of concurrently receiving within overlapping frequency resources, a quantity of frequency domain allocation positions that the UE is capable of concurrently monitoring for a wake-up signal waveform, a respective quantity of time domain hypotheses supported by the UE for each wake-up signal waveform type, or any combination thereof;

transmitting an indication of a set of wake-up signals to be monitored by the UE while operating in a low power mode, the set of wake-up signals based at least in part on the respective set of one or more wake-up signal parameters and the one or more wake-up signal waveform types that are supported by the UE; and transmitting at least one wake-up signal of the set of wake-up signals based at least in part on the indication.

24. The method of claim 23, further comprising:

transmitting an indication of a respective set of sequence parameters associated with each wake-up signal of the set of wake-up signals, a respective frequency position associated with each wake-up signal of the set of wake-up signals, a respective time slot associated with each wake-up signal, or any combination thereof, wherein transmitting the at least one wake-up signal is further based at least in part on the respective sets of sequence parameters, the respective frequency positions, the respective time slots, or any combination thereof.

25. The method of claim 23, wherein the respective sequence lengths each comprise a respective quantity of time-domain symbols included in a respective wake-up signal waveform type.

26. The method of claim 23, wherein each waveform sequence of the quantity corresponds to a respective sequence of one or more values.

* * * * *